(12) United States Patent
Han et al.

(10) Patent No.: US 11,968,058 B2
(45) Date of Patent: Apr. 23, 2024

(54) METHOD FOR ADDING SMART HOME DEVICE TO CONTACTS AND SYSTEM

(71) Applicant: Huawei Technologies Co., Ltd., Shenzhen (CN)

(72) Inventors: Xiao Han, Shenzhen (CN); Feng Ge, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 197 days.

(21) Appl. No.: 17/608,346

(22) PCT Filed: Apr. 24, 2020

(86) PCT No.: PCT/CN2020/086596
§ 371 (c)(1),
(2) Date: Nov. 2, 2021

(87) PCT Pub. No.: WO2020/224447
PCT Pub. Date: Nov. 12, 2020

(65) Prior Publication Data
US 2022/0255766 A1 Aug. 11, 2022

(30) Foreign Application Priority Data
May 5, 2019 (CN) .......................... 201910368445.8

(51) Int. Cl.
*H04L 12/28* (2006.01)
*H04M 1/72484* (2021.01)
(52) U.S. Cl.
CPC .... *H04L 12/2807* (2013.01); *H04M 1/72484* (2021.01)

(58) Field of Classification Search
CPC .......... H04L 12/2807; H04L 2101/365; H04L 61/4557; H04M 1/72484
See application file for complete search history.

(56) References Cited

U.S. PATENT DOCUMENTS 10,142,122 B1 * 11/2018 Hill .................... H04L 12/2807
2006/0080408 A1 * 4/2006 Istvan ................ H04N 21/4147
725/38

(Continued)

FOREIGN PATENT DOCUMENTS

CN 1674564 A 9/2005
CN 104460365 A 3/2015

(Continued)

OTHER PUBLICATIONS

ITU-T H.264, "Series H: Audiovisual and Multimedia Systems, Infrastructure of audiovisual services—Coding of moving video, Advanced video coding for generic audiovisual services," Apr. 2017, 812 pages.

*Primary Examiner* — Abdullahi E Salad
(74) *Attorney, Agent, or Firm* — Conley Rose, P.C.

(57) ABSTRACT

A system for adding a smart home device includes a first mobile phone configured to set, using contact information of a second user, a second mobile phone allowed to make a call to the smart home device, the second mobile phone is configured to automatically add contact information of the smart home device and make a voice call or a video call with the smart home device using the contact information of the smart home device, such that a user is configured to enable, in a setting manner of the smart home device, a friend to automatically discover the smart home device, and then make an audio call or a video call.

20 Claims, 26 Drawing Sheets

(56) References Cited

U.S. PATENT DOCUMENTS

| | | | |
|---|---|---|---|
| 2009/0022143 A1* | 1/2009 | Cassanova | H04L 65/1094 |
| | | | 370/352 |
| 2011/0211584 A1* | 9/2011 | Mahmoud | H04L 12/2834 |
| | | | 370/401 |
| 2012/0263170 A1* | 10/2012 | Wang | H04M 3/42246 |
| | | | 370/352 |
| 2015/0098309 A1 | 4/2015 | William et al. | |
| 2016/0309036 A1* | 10/2016 | Li | H04L 65/1096 |
| 2017/0019265 A1* | 1/2017 | Hou | H04L 12/2823 |
| 2017/0163435 A1* | 6/2017 | Ehsani | G06F 3/167 |
| 2019/0312867 A1 | 10/2019 | Nakamura | |

FOREIGN PATENT DOCUMENTS

| | | |
|---|---|---|
| CN | 105763418 A | 7/2016 |
| CN | 105898181 A | 8/2016 |
| CN | 106817627 A | 6/2017 |
| CN | 110198362 A | 9/2019 |
| EP | 3292529 A1 | 3/2018 |
| EP | 3944595 A1 | 1/2022 |
| WO | 2012088049 A1 | 6/2012 |
| WO | 2016179197 A1 | 11/2016 |
| WO | 2018186157 A1 | 10/2018 |

\* cited by examiner

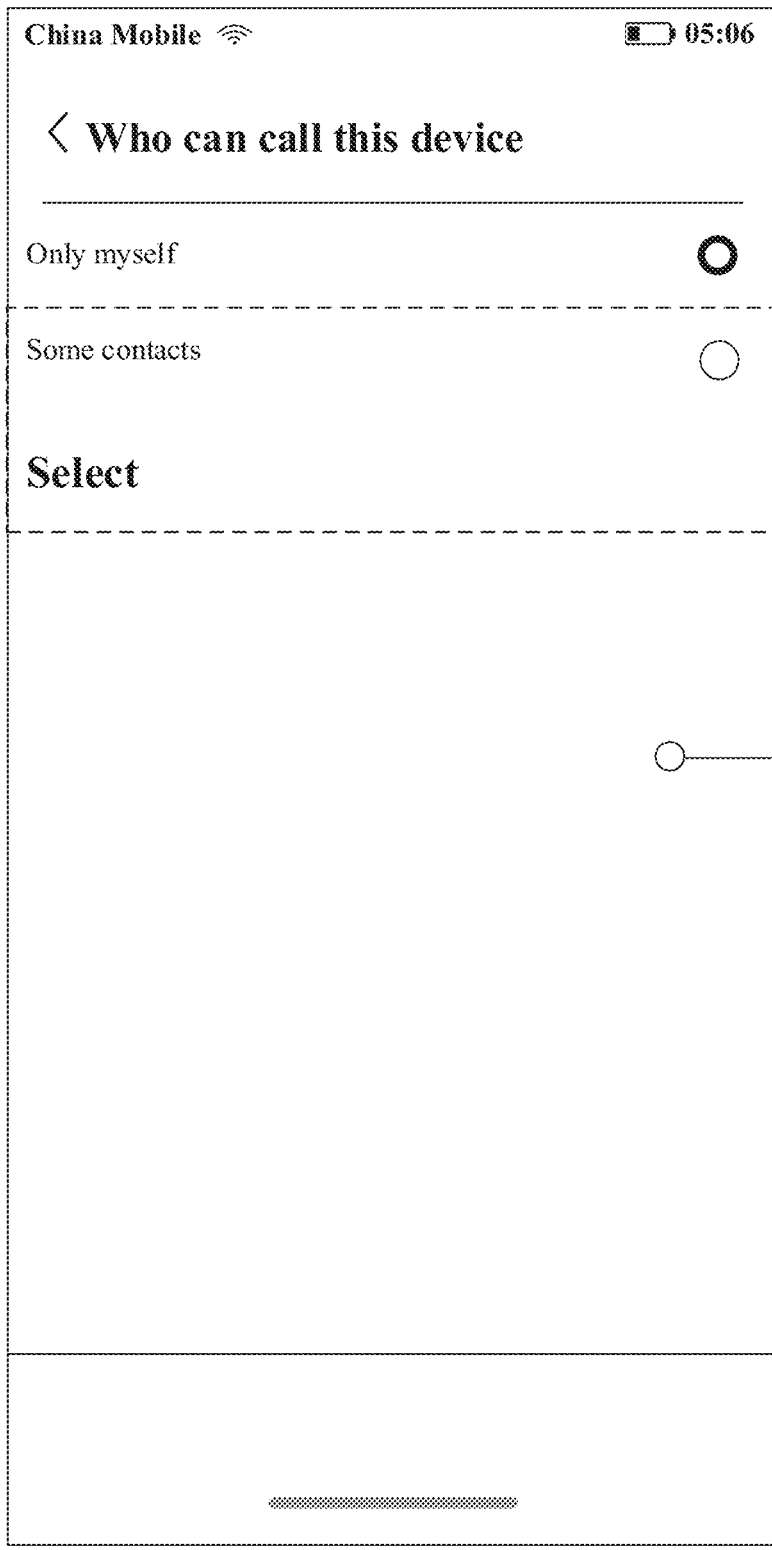
FIG. 7B(1)

FIG. 7B(2)

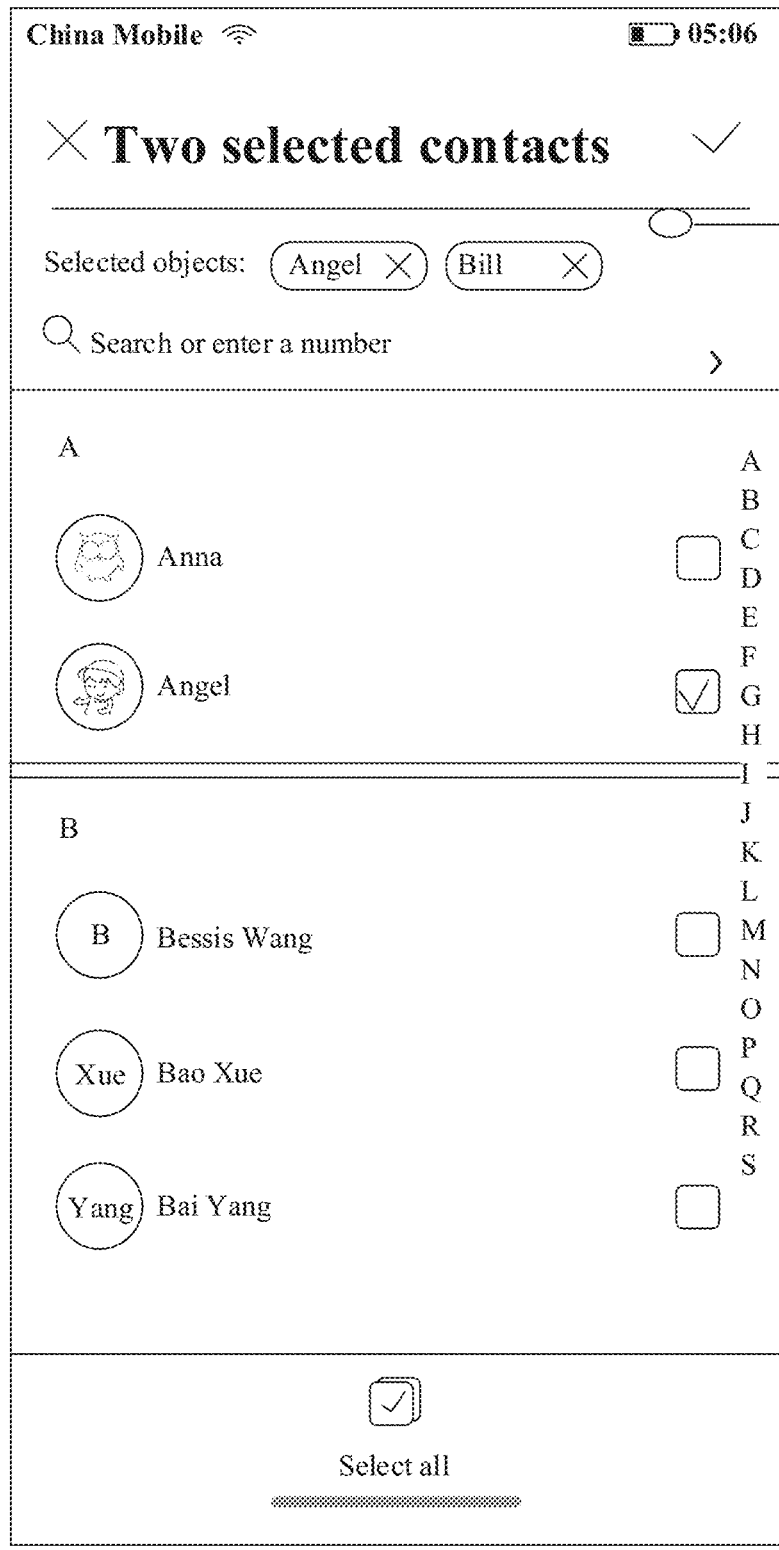
FIG. 7B(3)

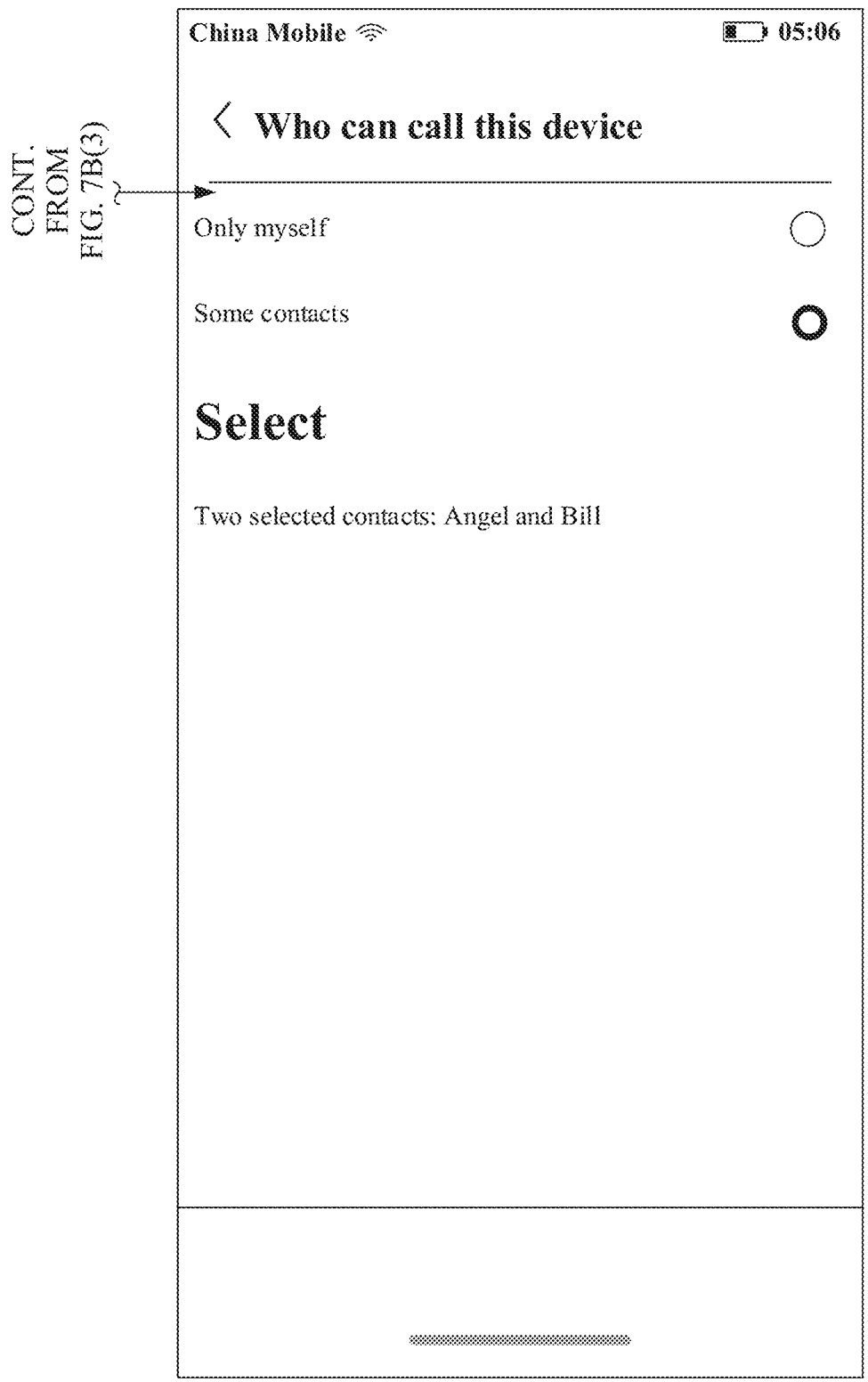
FIG. 7B(4)

FIG. 7D(1)

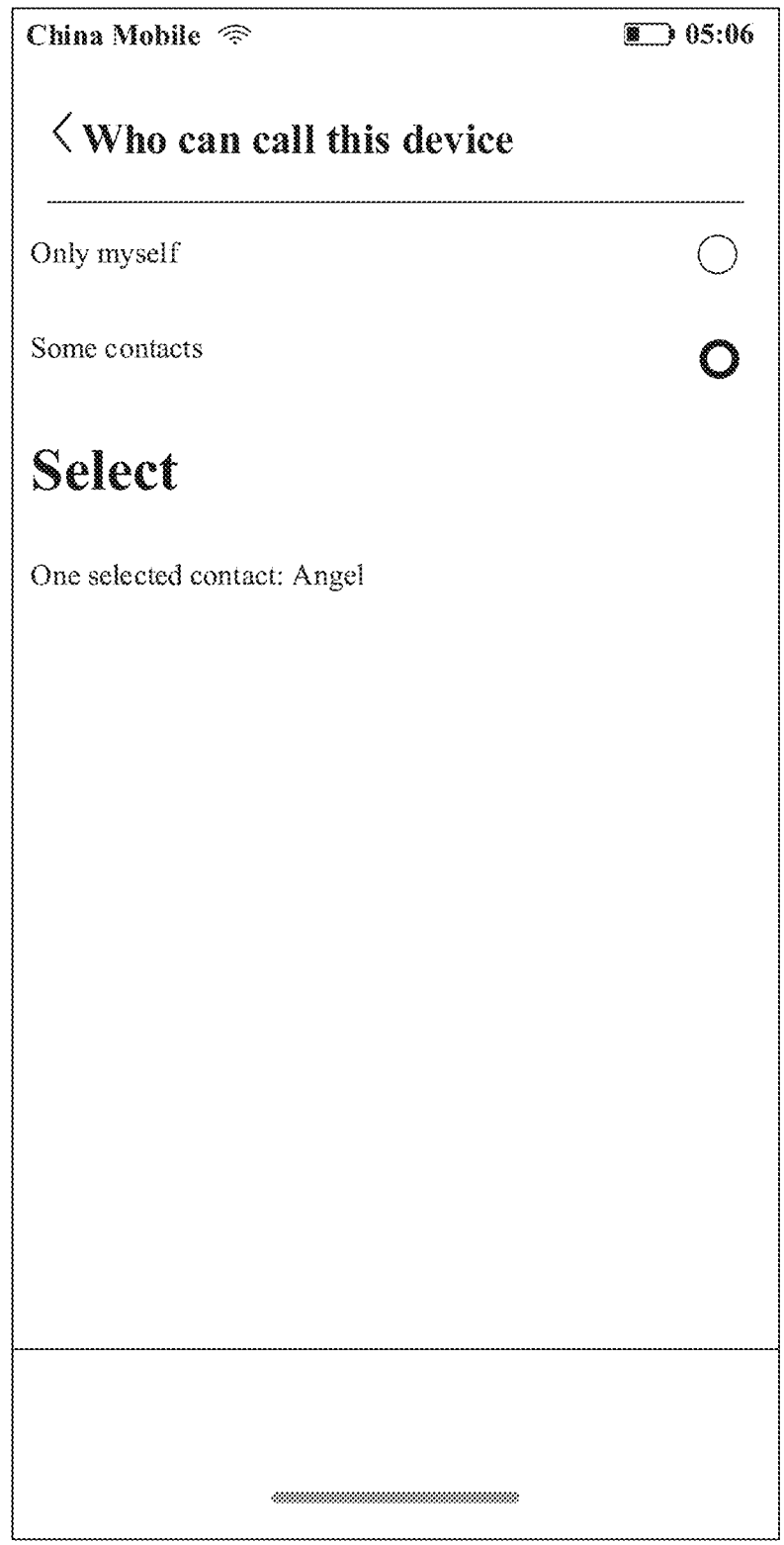
FIG. 7D(2)

METHOD FOR ADDING SMART HOME DEVICE TO CONTACTS AND SYSTEM

This application claims priority to Chinese Patent Application No. 201910368445.8, filed with the China National Intellectual Property Administration on May 5, 2019 and entitled "METHOD FOR ADDING SMART HOME DEVICE TO CONTACTS AND SYSTEM", which is incorporated herein by reference in its entirety.

TECHNICAL FIELD

This application relates to the field of communications technologies, and in particular, to a method for adding a smart home device to contacts and a system.

BACKGROUND

With development of smart home devices, people can make a call through a smart home device, for example, make a call through a smart speaker or make a video call through a television. A user may also enable a friend to directly make a call to a smart home device of the user, for example, enable the friend to directly make a call to a smart speaker of the user. Therefore, call experience can be greatly improved.

After a user or a family purchases a new smart home device, how to let friends of the user or the family know that the user or the family has purchased the new smart home device, so that the friends can directly make a call to the smart home device of the user or the family is an urgent problem to be resolved.

SUMMARY

Embodiments of this application provide a method for adding a smart home device to contacts and a system, so that a user can discover a smart home device, to improve use efficiency of the smart home device and user experience.

To achieve the foregoing objectives, the following technical solutions are used in this application.

According to a first aspect, an embodiment of this application provides a system. The system includes a server, a first electronic device, a second electronic device, and a smart home device. The first electronic device and the smart home device log in by using an account of a first user, and the second electronic device logs in by using an account of a second user; and the first electronic device stores contact information of the second user, and the second electronic device stores contact information of the first user. The first electronic device is configured to send a device identifier of the smart home device to the server. The first electronic device is further configured to set, by using the contact information of the second user, that the second electronic device is allowed to make a call to the smart home device. The server is configured to send the device identifier of the smart home device to the second electronic device based on a fact that the first electronic device sets that the second electronic device is allowed to make a call to the smart home device. The second electronic device is configured to automatically add contact information of the smart home device based on the device identifier of the smart home device. The second electronic device is further configured to: detect a first touch input or a first voice input, and establish a voice call or a video call with the smart home device in response to the first touch input or the voice input.

Therefore, the system in this application is used, so that the contact information of the smart home device can be automatically added to the second electronic device, to quickly and conveniently save time for adding the contact information.

In a possible implementation of the first aspect, the first electronic device is a first mobile phone, the second electronic device is a second mobile phone, and the smart home device is a smart speaker, a smart television, or the like.

According to any one of the first aspect or the implementation of the first aspect, the server is configured to store account information of the first user and account information of the second user.

According to any one of the first aspect or the implementations of the first aspect, the server is configured to determine that the first electronic device stores the contact information of the second user and the second electronic device stores the contact information of the first user. In the foregoing setting manner, the server sends the device identifier of the smart home device to the second electronic device only after determining that the first user and the second user are in a friend relationship with each other, to ensure privacy of the first user.

According to any one of the first aspect or the implementations of the first aspect, the smart home device is configured to: detect the first touch input or the first voice input, and establish the voice call or the video call with the second electronic device in response to the first touch input or the voice input. In the foregoing setting manner, only when the user performs a specific operation, the smart home device can be triggered to establish the voice call or the video call. In this way, a call process can be triggered based on an actual requirement of the user, so that the smart home device is more intelligent.

According to any one of the first aspect or the implementations of the first aspect, the first electronic device is further configured to send a first switching request, where the first switching request is used to request to switch the voice call or the video call that is being made on the smart home device to the first electronic device. In the foregoing setting manner, only when the user performs a specific operation, the first electronic device can be triggered to send the first switching request information. In this way, a voice switching procedure can be triggered based on an actual requirement of the user, so that the first electronic device is more intelligent, and user experience is also improved.

According to any one of the first aspect or the implementations of the first aspect, the second electronic device is further configured to automatically add the contact information of the smart home device to contacts of the second electronic device. In the foregoing setting manner, the contact information of the smart home device can be directly discovered in the contacts. In this way, an update speed is fast, contact is convenient, and an application does not need to be opened. Therefore, steps are relatively simple, and user experience is improved.

According to any one of the first aspect or the implementations of the first aspect, the contacts of the second electronic device further include the contact information of the first user. In the foregoing setting manner, both the contact information of the first user and the contact information of the smart home device are stored in the contacts to facilitate searching. This is simple and convenient, and improves user experience.

According to any one of the first aspect or the implementations of the first aspect, the second electronic device is configured to display a notification message, where the notification message is used to prompt the second user that the voice call or the video call can be made to the smart home device by using the contact information of the smart home device. In the foregoing setting manner, the user is reminded, and user experience is improved.

According to any one of the first aspect or the implementations of the first aspect, the notification message is displayed in a form of a banner or is displayed in an interface obtained after a notification panel is pulled down.

According to any one of the first aspect or the implementations of the first aspect, the second electronic device is further configured to: display the contact information of the smart home device in the contacts of the second electronic device, where the contact information includes a name of the smart home device; and in response to a remark operation performed on the name of the smart home device, display the name of the smart home device in the contacts of the second electronic device by using a name obtained after the remark. In the foregoing setting manner, the user may remark a name based on a preference of the user, so that the user can simply and clearly learn of the device to which the name points, to improve user experience.

According to a second aspect, an embodiment of this application provides a method for adding contact information of a smart home device. The method includes: performing, by a first electronic device and the smart home device, login by using an account of a first user, and performing, by a second electronic device, login by using an account of a second user, where the first electronic device stores contact information of the second user, and the second electronic device stores contact information of the first user. The first electronic device sends an identifier of the smart home device to a server. The first electronic device sets, by using the contact information of the second user, that the second electronic device is allowed to make a call to the smart home device. The second electronic device receives the device identifier that is of the smart home device and that is sent by the server. The second electronic device automatically adds the contact information of the smart home device based on the device identifier of the smart home device. The second electronic device detects a first touch operation or a first voice input. The second electronic device establishes a voice call or a video call with the smart home device in response to the first touch operation or the first voice input.

Therefore, according to the method in this application, after the first user purchases the smart home device and logs in by using the account of the first user, the second electronic device is configured to automatically add the contact information of the smart home device based on the device identifier of the smart home device, and does not need to send a friend verification message and obtain consent from a friend before adding the smart home device. This is simple and convenient. Further, the second electronic device may establish the voice call or the video call with the smart home device. This is simple and convenient, improves user experience, saves steps and time, and is suitable for a fast-paced life.

In a possible implementation of the second aspect, the first electronic device is a first mobile phone, the second electronic device is a second mobile phone, and the smart home device is a smart speaker, a smart television, or the like.

According to any one of the second aspect or the implementation of the second aspect, the server sends the device identifier of the smart home device to the second electronic device based on a fact that the first electronic device sets that the second electronic device is allowed to make a call to the smart home device In the foregoing setting manner, a selection right of the first user is ensured, and the second electronic device has permission only when the first user allows the second electronic device to make a call, to ensure privacy and a selection right of the user, and improve user experience.

According to any one of the second aspect or the implementations of the second aspect, before the server sends the device identifier of the smart home device to the second electronic device, the server determines that the first electronic device stores the contact information of the second user and the second electronic device stores the contact information of the first user. In the foregoing setting manner, the server sends the device identifier of the smart home device to the second electronic device only after determining that the first user and the second user are in a friend relationship with each other, to ensure privacy of the first user.

According to any one of the second aspect or the implementations of the second aspect, the first electronic device sends a first switching request, where the first switching request is used to request to switch the voice call or the video call that is being made on the smart home device to the first electronic device; and switches the voice call or the video call from the smart home device to the first electronic device. In the foregoing setting manner, only when the user performs a specific operation, the first electronic device can be triggered to send the first switching request information. In this way, a voice switching procedure can be triggered based on an actual requirement of the user, so that the first electronic device is more intelligent, and user experience is also improved.

According to any one of the second aspect or the implementations of the second aspect, the second electronic device automatically adds the contact information of the smart home device to contacts. In the foregoing setting manner, the contact information of the smart home device can be directly discovered in the contacts. In this way, an update speed is fast, contact is convenient, and an application does not need to be opened. Therefore, steps are relatively simple, and user experience is improved.

According to any one of the second aspect or the implementations of the second aspect, the contact information of the first user is stored in the contacts of the second electronic device. In the foregoing setting manner, both the contact information of the first user and the contact information of the smart home device are stored in the contacts to facilitate searching. This is simple and convenient, and improves user experience.

According to any one of the second aspect or the implementations of the second aspect, the method further includes: displaying a notification message on the second electronic device, where the notification message is used to prompt the second user that the voice call or the video call can be made to the smart home device by using the contact information of the smart home device. In the foregoing setting manner, the user is reminded, and user experience is improved.

According to any one of the second aspect or the implementations of the second aspect, the notification message is displayed in a form of a banner or is displayed in an interface obtained after a notification panel is pulled down.

According to any one of the second aspect or the implementations of the second aspect, the method further includes: displaying the contact information of the smart home device in the contacts of the second electronic device, where the contact information includes a name of the smart home device; and in response to a remark operation performed on the name of the smart home device, displaying the name of the smart home device in the contacts of the second electronic device by using a name obtained after the remark. In the foregoing setting manner, the user may remark a name based on a preference of the user, so that the user can simply and clearly learn of the device to which the name points, to improve user experience.

Based on the foregoing system and method, the user can automatically discover and add the smart home device. In this way, a cumbersome addition process is not required, privacy of the user is protected, and use efficiency of the smart home device and user experience are improved.

BRIEF DESCRIPTION OF DRAWINGS

FIGS. 7B(1) to FIG. 7B(4) are a schematic diagram of a scenario of a method for adding a smart home device according to an embodiment of this application;

FIGS. 7D(1) and FIG. 7D(2) are a schematic diagram of a scenario of a method for adding a smart home device according to an embodiment of this application;

DESCRIPTION OF EMBODIMENTS

Figure 1:
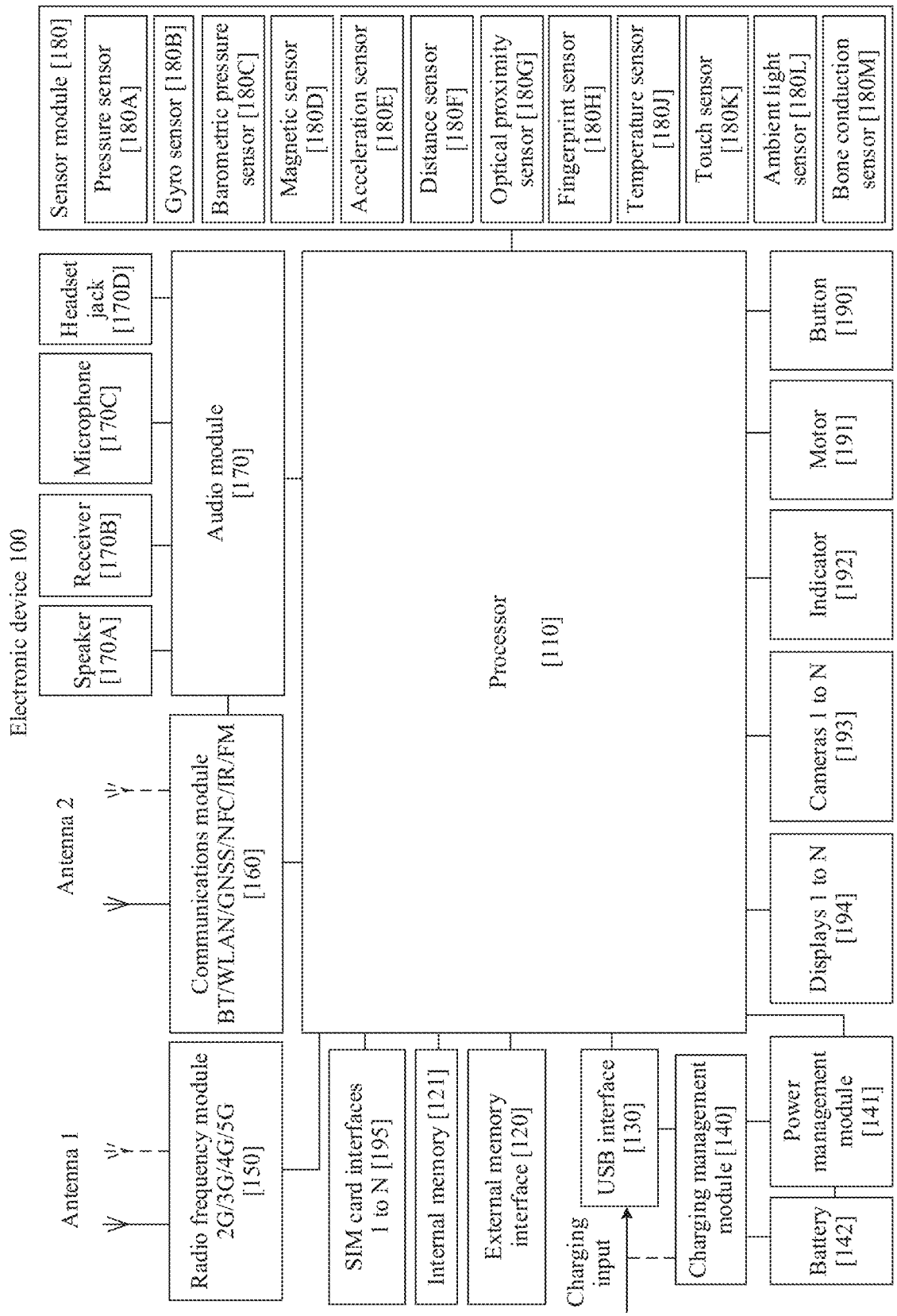
FIG. 1 is a schematic diagram of a structure of an electronic device according to an embodiment of this application.

Terms used in the following embodiments of this application are merely for the purpose of describing specific embodiments, but are not intended to limit this application. Terms "one", "a", "the", "the foregoing", and "this" of singular forms used in this specification and the appended claims of this application are also intended to include plural forms such as "one or more", unless otherwise specified in the context clearly. It should be further understood that the term "and/or" used in this application indicates and includes any or all possible combinations of one or more listed items.

Reference to "an embodiment", "some embodiments", or the like described in this specification indicates that at least one embodiment of this application includes a specific feature, structure, or characteristic described with reference to the embodiments. Therefore, in this specification, statements, such as "in an embodiment", "in some embodiments", "in some other embodiments", and "in other embodiments", that appear at different places do not necessarily mean referring to a same embodiment. Instead, the statements mean "one or more but not all of the embodiments", unless otherwise specifically emphasized in another manner. The terms "include", "have", and variants of the terms all mean "include but are not limited to", unless otherwise specifically emphasized in another manner.

According to the context, the term "when" used in the following embodiments may be interpreted as a meaning of "if", "after", "in response to determining", or "in response to detecting". Similarly, according to the context, the phrase "when it is determined that" or "if (a stated condition or event) is detected" may be interpreted as a meaning of "if it is determined that", "in response to determining", "when (a stated condition or event) is detected", or "in response to detecting (a stated condition or event)".

It should be understood that although terms such as "first electronic device" and "second electronic device" may be used to describe various electronic devices in this specification, these electronic devices shall not be limited by these terms. These terms are merely used for distinguishing an electronic device from another electronic device. For example, the first electronic device may be named a second electronic device and the second electronic device may be similarly named a first electronic device without departing from the scope of this application. Both the first electronic device and the second electronic device are electronic devices, but the first electronic device and the second electronic device may not be a same electronic device, or may be a same electronic device in some scenarios.

The following describes an electronic device (for example, a first electronic device, a second electronic device, or a third electronic device), a user interface used for such an electronic device, and embodiments used for using such an electronic device. In some embodiments, the electronic device may be a portable electronic device that further includes other functions such as a personal digital assistant (personal digital assistant, PDA) function and/or a music player function, for example, a mobile phone, a tablet computer, or a wearable electronic device (for example, a smartwatch) having a wireless communication function. An example embodiment of the portable electronic device includes but is not limited to a portable electronic device using iOS®, Android®, Microsoft®, or another operating system. The portable electronic device may alternatively be another portable electronic device, for example, a desktop computer or a laptop (Laptop) computer having a touch panel or a touch-sensitive surface. It should be further understood that, in some other embodiments, the foregoing electronic device may not be the portable electronic device but a desktop computer.

The following describes implementations of the embodiments in detail with reference to the accompanying drawings. For example, FIG. 1 is a schematic diagram of a structure of an electronic device 100.

The electronic device 100 may include a processor 110, an external memory interface 120, an internal memory 121, a universal serial bus (universal serial bus, USB) interface 130, a charging management module 140, a power management module 141, a battery 142, an antenna 1, an antenna 2, a mobile communications module 150, a wireless communications module 160, an audio module 170, a speaker 170A, a receiver 170B, a microphone 170C, a headset jack 170D, a sensor module 180, a button 190, a motor 191, an indicator 192, a camera 193, a display 194, a subscriber identification module (subscriber identification module, SIM) card interface 195, and the like. The sensor module 180 may include a pressure sensor 180A, a gyro sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It can be understood that the structure shown in this embodiment of the present invention does not constitute a specific limitation on the electronic device 100. In some other embodiments of this application, the electronic device 100 may include more or fewer components than those shown in the figure, combine some components, split some components, or have different component arrangements. The components shown in the figure may be implemented by using hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a video codec, a digital signal processor (digital signal processor, DSP), a baseband processor, and/or a neural-network processing unit (neural-network processing unit, NPU). Different processing units may be independent components, or may be integrated into one or more processors.

The controller may generate an operation control signal based on instruction operation code and a time sequence signal, to complete control of instruction reading and instruction execution.

A memory may be further disposed in the processor 110, and is configured to store instructions and data. In some embodiments, the memory in the processor 110 is a cache. The memory may store instructions or data just used or cyclically used by the processor 110. If the processor 110 needs to use the instructions or the data again, the processor 110 may directly invoke the instructions or the data from the memory. This avoids repeated access and reduces a waiting time of the processor 110. Therefore, system efficiency is improved.

In some embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identification module (subscriber identification module, SIM) interface, a universal serial bus (universal serial bus, USB) interface, and/or the like.

The I2C interface is a two-way synchronization serial bus, and includes a serial data line (serial data line, SDA) and a serial clock line (serial clock line, SCL). In some embodiments, the processor 110 may include a plurality of groups of I2C buses. The processor 110 may be separately coupled to the touch sensor 180K, a charger, a flash, the camera 193, and the like through different I2C bus interfaces. For example, the processor 110 may be coupled to the touch sensor 180K through the I2C interface, so that the processor 110 communicates with the touch sensor 180K through the I2C bus interface, to implement a touch function of the electronic device 100.

The I2S interface may be configured to perform audio communication. In some embodiments, the processor 110 may include a plurality of groups of I2S buses. The processor 110 may be coupled to the audio module 170 through the I2S bus, to implement communication between the processor 110 and the audio module 170. In some embodiments, the audio module 170 may transmit an audio signal to the wireless communications module 160 through the I2S interface, to implement a function of answering a call by using a Bluetooth headset.

The PCM interface may also be configured to: perform audio communication, and sample, quantize, and code an analog signal. In some embodiments, the audio module 170 may be coupled to the wireless communications module 160 through a PCM bus interface. In some embodiments, the audio module 170 may also transmit an audio signal to the wireless communications module 160 through the PCM interface, to implement a function of answering a call by using the Bluetooth headset. Both the I2S interface and the PCM interface may be configured to perform audio communication.

The UART interface is a universal serial data bus, and is configured to perform asynchronous communication. The bus may be a two-way communications bus, and converts to-be-transmitted data between serial communication and parallel communication. In some embodiments, the UART interface is usually configured to connect the processor 110 to the wireless communications module 160. For example, the processor 110 communicates with a Bluetooth module in the wireless communications module 160 through the UART interface, to implement a Bluetooth function. In some embodiments, the audio module 170 may transmit an audio signal to the wireless communications module 160 through the UART interface, to implement a function of playing music by using the Bluetooth headset.

The MIPI interface may be configured to connect the processor 110 to a peripheral device such as the display 194 or the camera 193. The MIPI interface includes a camera serial interface (camera serial interface, CSI), a display serial interface (display serial interface, DSI), and the like. In some embodiments, the processor 110 communicates with the camera 193 through the CSI interface, to implement a photographing function of the electronic device 100. The processor 110 communicates with the display 194 through the DSI interface, to implement a display function of the electronic device 100.

The GPIO interface may be configured by using software. The GPIO interface may be configured as a control signal or a data signal. In some embodiments, the GPIO interface may be configured to connect the processor 110 to the camera 193, the display 194, the wireless communications module 160, the audio module 170, the sensor module 180, and the like. The GPIO interface may alternatively be configured as the I2C interface, the I2S interface, the UART interface, the MIPI interface, or the like.

The USB interface 130 is an interface that conforms to a USB standard specification, and may be specifically a mini USB interface, a micro USB interface, a USB Type-C interface, or the like. The USB interface 130 may be configured to connect to the charger to charge the electronic device 100, may be configured to transmit data between the electronic device 100 and a peripheral device, or may be configured to connect to a headset to play audio by using the headset. Alternatively, the interface may be configured to connect to another electronic device, for example, an AR device.

It may be understood that an interface connection relationship between the modules that is shown in this embodiment of the present invention is merely an example for description, and does not constitute a limitation on the structure of the electronic device 100. In some other embodiments of this application, the electronic device 100 may alternatively use an interface connection manner different from that in the foregoing embodiment, or a combination of a plurality of interface connection manners.

The charging management module 140 is configured to receive a charging input from the charger. The charger may be a wireless charger or a wired charger. In some embodiments of wired charging, the charging management module 140 may receive a charging input from the wired charger through the USB interface 130. In some embodiments of wireless charging, the charging management module 140 may receive a wireless charging input through a wireless charging coil of the electronic device 100. The charging management module 140 may further supply power to the electronic device by using the power management module 141 while charging the battery 142.

The power management module 141 is configured to connect to the battery 142, the charging management module 140, and the processor 110. The power management module 141 receives an input of the battery 142 and/or an input of the charging management module 140, and supplies power to the processor 110, the internal memory 121, the display 194, the camera 193, the wireless communications module 160, and the like. The power management module 141 may be further configured to monitor parameters such as a battery capacity, a quantity of battery cycles, and a battery health status (electric leakage or impedance). In some other embodiments, the power management module 141 may alternatively be disposed in the processor 110. In some other embodiments, the power management module 141 and the charging management module 140 may alternatively be disposed in a same device.

A wireless communication function of the electronic device 100 may be implemented through the antenna 1, the antenna 2, the mobile communications module 150, the wireless communications module 160, the modem processor, the baseband processor, and the like.

The antenna 1 and the antenna 2 are configured to: transmit and receive electromagnetic wave signals. Each antenna in the electronic device 100 may be configured to cover one or more communication bands. Different antennas may be further multiplexed, to improve antenna utilization. For example, the antenna 1 may be multiplexed as a diversity antenna in a wireless local area network. In some other embodiments, the antenna may be used in combination with a tuning switch.

The mobile communications module 150 may provide a wireless communication solution that includes 2G/3G/4G/5G or the like and that is applied to the electronic device 100. The mobile communications module 150 may include at least one filter, a switch, a power amplifier, a low noise amplifier (low noise amplifier, LNA), and the like. The mobile communications module 150 may receive an electromagnetic wave through the antenna 1, perform processing such as filtering and amplification on the received electromagnetic wave, and transmit the received electromagnetic wave to the modem processor for demodulation. The mobile communications module 150 may further amplify a signal modulated by the modem processor, and convert an amplified signal into an electromagnetic wave through the antenna 1 for radiation. In some embodiments, at least some functional modules of the mobile communications module 150 may be disposed in the processor 110. In some embodiments, at least some functional modules of the mobile communications module 150 may be disposed in a same device as at least some modules of the processor 110.

The modem processor may include a modulator and a demodulator. The modulator is configured to modulate a to-be-sent low-frequency baseband signal into a medium or high-frequency signal. The demodulator is configured to demodulate a received electromagnetic wave signal into a low-frequency baseband signal. Then, the demodulator transmits the low-frequency baseband signal obtained through demodulation to the baseband processor for processing. The low-frequency baseband signal is processed by the baseband processor, and then transmitted to the application processor. The application processor outputs a sound signal through an audio device (which is not limited to the speaker 170A, the receiver 170B, or the like), or displays an image or a video through the display 194. In some embodiments, the modem processor may be an independent component. In some other embodiments, the modem processor may be independent of the processor 110, and is disposed in a same device as the mobile communications module 150 or another functional module.

The wireless communications module 160 may provide a wireless communication solution that includes a wireless local area network (wireless local area network, WLAN) (for example, a wireless fidelity (wireless fidelity, Wi-Fi) network), Bluetooth (Bluetooth, BT), a global navigation satellite system (global navigation satellite system, GNSS), frequency modulation (frequency modulation, FM), a near field communication (near field communication, NFC) technology, an infrared (infrared, IR) technology, or the like and that is applied to the electronic device 100. The wireless communications module 160 may be one or more components integrating at least one communications processor module. The wireless communications module 160 receives an electromagnetic wave through the antenna 2, performs frequency modulation and filtering processing on an electromagnetic wave signal, and sends a processed signal to the processor 110. The wireless communications module 160 may further receive a to-be-sent signal from the processor 110, perform frequency modulation and amplification on the signal, and convert the signal into an electromagnetic wave through the antenna 2 for radiation.

In some embodiments, the antenna 1 and the mobile communications module 150 in the electronic device 100 are coupled, and the antenna 2 and the wireless communications module 160 in the electronic device 100 are coupled, so that the electronic device 100 can communicate with a network and another device by using a wireless communications technology. The wireless communications technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-CDMA), long term evolution (long term evolution, LTE), a voice over internet protocol (Voice over Internet Protocol, VoIP), BT, a GNSS, a WLAN, NFC, FM, an IR technology, and/or the like. The GNSS may include a global positioning system (global positioning system, GPS), a global navigation satellite system (global navigation satellite system, GLONASS), a BeiDou navigation satellite system (BeiDou navigation satellite system, BDS), a quasi-zenith satellite system (quasi-zenith satellite system, QZSS), and/or satellite based augmentation systems (satellite based augmentation systems, SBAS).

The electronic device 100 implements a display function through the GPU, the display 194, the application processor, and the like. The GPU is a microprocessor for image processing, and is connected to the display 194 and the application processor. The GPU is configured to: perform mathematical and geometric calculation, and render an image. The processor 110 may include one or more GPUs that execute program instructions to generate or change display information.

The display 194 is configured to display an image, a video, or the like. The display 194 includes a display panel. The display panel may be a liquid crystal display (liquid crystal display, LCD), an organic light-emitting diode (organic light-emitting diode, OLED), an active-matrix organic light emitting diode (active-matrix organic light emitting diode, AMOLED), a flexible light-emitting diode (flexible light-emitting diode, FLED), a mini LED, a micro LED, a micro OLED, quantum dot light emitting diodes (quantum dot light emitting diodes, QLED), or the like. In some embodiments, the electronic device 100 may include one or N displays 194, where N is a positive integer greater than 1.

The electronic device 100 may implement a photographing function through the ISP, the camera 193, the video codec, the GPU, the display 194, the application processor, and the like.

The ISP is configured to process data fed back by the camera 193. For example, during photographing, a shutter is pressed, and light is transmitted to a photosensitive element of the camera through a lens. An optical signal is converted into an electrical signal, and the photosensitive element of the camera transmits the electrical signal to the ISP for processing, to convert the electrical signal into a visible image. The ISP may further perform algorithm optimization on noise, brightness, and complexion of the image. The ISP may further optimize parameters such as exposure and color temperature of a photographing scenario. In some embodiments, the ISP may be disposed in the camera 193.

The camera 193 is configured to capture a static image or a video. An optical image of an object is generated through the lens, and is projected onto the photosensitive element. The photosensitive element may be a charge coupled device (charge coupled device, CCD) or a complementary metal-oxide-semiconductor (complementary metal-oxide-semiconductor, CMOS) phototransistor. The photosensitive element converts an optical signal into an electrical signal, and then transmits the electrical signal to the ISP to convert the electrical signal into a digital image signal. The ISP outputs the digital image signal to the DSP for processing. The DSP converts the digital image signal into an image signal in a standard format such as an RGB format or a YUV format. In some embodiments, the electronic device 100 may include one or N cameras 193, where N is a positive integer greater than 1.

The digital signal processor is configured to process a digital signal, and may process another digital signal in addition to the digital image signal. For example, when the electronic device 100 selects a frequency, the digital signal processor is configured to perform Fourier transform on frequency energy.

The video codec is configured to: compress or decompress a digital video. The electronic device 100 may support one or more video codecs. In this way, the electronic device 100 may play or record videos in a plurality of coding formats, for example, moving picture experts group (moving picture experts group, MPEG)-1, MPEG-2, MPEG-3, and MPEG-4.

The NPU is a neural-network (neural-network, NN) computing processor, quickly processes input information by referring to a structure of a biological neural network, for example, by referring to a transfer mode between human brain neurons, and may further continuously perform self-learning. The NPU can implement applications such as intelligent cognition of the electronic device 100, such as image recognition, facial recognition, speech recognition, and text understanding.

The external memory interface 120 may be configured to connect to an external storage card, for example, a micro SD card, to extend a storage capability of the electronic device 100. The external storage card communicates with the processor 110 through the external memory interface 120, to implement a data storage function. For example, files such as music and a video are stored in the external storage card.

The internal memory 121 may be configured to store computer executable program code. The executable program code includes instructions. The internal memory 121 may include a program storage area and a data storage area. The program storage area may store an operating system, an application required by at least one function (for example, a sound playing function or an image playing function), and the like. The data storage area may store data (such as audio data and a phone book) created during use of the electronic device 100, and the like. In addition, the internal memory 121 may include a high-speed random access memory, or may include a nonvolatile memory, for example, at least one magnetic disk storage device, a flash memory, or a universal flash storage (universal flash storage, UFS). The processor 110 runs the instructions stored in the internal memory 121 and/or the instructions stored in the memory disposed in the processor, to perform various function applications of the electronic device 100 and data processing.

The electronic device 100 may implement audio functions, for example, music playing and recording, by using the audio module 170, the speaker 170A, the receiver 170B, the microphone 170C, the headset jack 170D, the application processor, and the like.

The audio module 170 is configured to convert digital audio information into an analog audio signal output, and is also configured to convert an analog audio input into a digital audio signal. The audio module 170 may be further configured to: code and decode an audio signal. In some embodiments, the audio module 170 may be disposed in the processor 110, or some functional modules of the audio module 170 are disposed in the processor 110.

The speaker 170A, also referred to as a "horn", is configured to convert an electrical audio signal into a sound signal. The electronic device 100 may listen to music or answer a hands-free call by using the speaker 170A.

The receiver 170B, also referred to as an "earpiece", is configured to convert an electrical audio signal into a sound signal. When a call is answered or voice information is received by using the electronic device 100, the receiver 170B may be put close to a human ear to receive a voice.

The microphone 170C, also referred to as a "mike" or a "microphone", is configured to convert a sound signal into an electrical signal. When making a call or sending voice information, a user may make a sound by moving a human mouth close to the microphone 170C to input a sound signal to the microphone 170C. At least one microphone 170C may be disposed in the electronic device 100. In some other embodiments, two microphones 170C may be disposed in the electronic device 100, to implement a noise reduction function in addition to collecting a sound signal. In some other embodiments, three, four, or more microphones 170C may alternatively be disposed in the electronic device 100, to collect a sound signal, reduce noise, identify a sound source, implement a directional recording function, and the like.

The headset jack 170D is configured to connect to a wired headset. The headset jack 170D may be the USB interface 130, or may be a 3.5 mm open mobile terminal platform (open mobile terminal platform, OMTP) standard interface or a cellular telecommunications industry association of the USA (cellular telecommunications industry association of the USA, CTIA) standard interface.

The pressure sensor 180A is configured to sense a pressure signal, and may convert the pressure signal into an electrical signal. In some embodiments, the pressure sensor 180A may be disposed on the display 194. There are many types of pressure sensors 180A such as a resistive pressure sensor, an inductive pressure sensor, and a capacitive pressure sensor. The capacitive pressure sensor may include at least two parallel plates made of conductive materials. When a force is applied to the pressure sensor 180A, capacitance between electrodes changes. The electronic device 100 determines pressure intensity based on the change of the capacitance. When a touch operation is performed on the display 194, the electronic device 100 detects intensity of the touch operation by using the pressure sensor 180A. The electronic device 100 may calculate a touch location based on a detection signal of the pressure sensor 180A. In some embodiments, touch operations that are performed at a same touch location but have different touch operation intensity may correspond to different operation instructions. For example, when a touch operation whose touch operation intensity is less than a first pressure threshold is performed on a Messages icon, an instruction for viewing an SMS message is executed. When a touch operation whose touch operation intensity is greater than or equal to the first pressure threshold is performed on a Messages icon, an instruction for creating a new SMS message is executed.

The gyro sensor 180B may be configured to determine a motion posture of the electronic device 100. In some embodiments, an angular velocity of the electronic device 100 around three axes (namely, axes x, y, and z) may be determined through the gyro sensor 180B. The gyro sensor 180B may be configured to perform image stabilization during photographing. For example, when the shutter is pressed, the gyro sensor 180B detects an angle at which the electronic device 100 jitters, obtains, through calculation based on the angle, a distance for which a lens module needs to compensate, and allows the lens to cancel the jitter of the electronic device 100 through reverse motion, to implement image stabilization. The gyro sensor 180B may be further used in a navigation scenario and a motion-sensing game scenario.

The barometric pressure sensor 180C is configured to measure barometric pressure. In some embodiments, the electronic device 100 calculates an altitude based on a value of the barometric pressure measured by the barometric pressure sensor 180C, to assist in positioning and navigation.

The magnetic sensor 180D includes a Hall sensor. The electronic device 100 may detect opening and closing of a flip leather case by using the magnetic sensor 180D. In some embodiments, when the electronic device 100 is a clamshell phone, the electronic device 100 may detect opening and closing of a flip cover by using the magnetic sensor 180D. Further, a feature such as automatic unlocking upon opening of the flip cover is set based on a detected opening or closing state of the leather case or a detected opening or closing state of the flip cover.

The acceleration sensor 180E may detect magnitude of accelerations in various directions (usually on three axes) of the electronic device 100, and may detect a magnitude and a direction of gravity when the electronic device 100 is still. The acceleration sensor 180E may be further configured to identify a posture of the electronic device, and is used in an application such as switching between landscape mode and portrait mode or a pedometer.

The distance sensor 180F is configured to measure a distance. The electronic device 100 may measure a distance in an infrared manner or a laser manner. In some embodiments, in a photographing scenario, the electronic device 100 may measure a distance by using the distance sensor 180F, to implement quick focusing.

The optical proximity sensor 180G may include, for example, a light-emitting diode (LED) and an optical detector such as a photodiode. The light-emitting diode may be an infrared light-emitting diode. The electronic device 100 emits infrared light by using the light-emitting diode. The electronic device 100 detects infrared reflected light from a nearby object by using the photodiode. When detecting sufficient reflected light, the electronic device 100 may determine that there is an object near the electronic device 100. When detecting insufficient reflected light, the electronic device 100 may determine that there is no object near the electronic device 100. The electronic device 100 may detect, by using the optical proximity sensor 180G, that the user holds the electronic device 100 close to an ear to make a call, to automatically perform screen-off for power saving. The optical proximity sensor 180G may also be used in a leather case mode or a pocket mode to automatically unlock or lock the screen.

The ambient light sensor 180L is configured to sense ambient light brightness. The electronic device 100 may adaptively adjust brightness of the display 194 based on the sensed ambient light brightness. The ambient light sensor 180L may also be configured to automatically adjust a white balance during photographing. The ambient light sensor 180L may also cooperate with the optical proximity sensor 180G to detect whether the electronic device 100 is in a pocket, to avoid an accidental touch.

The fingerprint sensor 180H is configured to collect a fingerprint. The electronic device 100 may use a feature of the collected fingerprint to implement fingerprint-based unlocking, application lock access, fingerprint-based photographing, fingerprint-based call answering, and the like.

The temperature sensor 180J is configured to detect a temperature. In some embodiments, the electronic device 100 executes a temperature processing policy based on the temperature detected by the temperature sensor 180J. For example, when the temperature reported by the temperature sensor 180J exceeds a threshold, the electronic device 100 lowers performance of a processor located near the temperature sensor 180J, to reduce power consumption to implement thermal protection. In some other embodiments, when the temperature is less than another threshold, the electronic device 100 heats the battery 142 to prevent the electronic device 100 from being abnormally powered off because of a low temperature. In some other embodiments, when the temperature is less than still another threshold, the electronic device 100 boosts an output voltage of the battery 142, to prevent abnormal power-off caused by a low temperature.

The touch sensor 180K is also referred to as a "touch component". The touch sensor 180K may be disposed on the display 194, and the touch sensor 180K and the display 194 form a touchscreen, which is also referred to as a "touchscreen". The touch sensor 180K is configured to detect a touch operation performed on or near the touch sensor 180K. The touch sensor may transfer the detected touch operation to the application processor, to determine a type of a touch event. The display 194 may provide a visual output related to the touch operation. In some other embodiments, the touch sensor 180K may alternatively be disposed on a surface of the electronic device 100 at a location different from that of the display 194.

The bone conduction sensor 180M may obtain a vibration signal. In some embodiments, the bone conduction sensor 180M may obtain a vibration signal of a vibration bone of a human vocal part. The bone conduction sensor 180M may also be in contact with a human pulse, and receive a blood pressure beating signal. In some embodiments, the bone conduction sensor 180M may alternatively be disposed in a headset to form a bone conduction headset. The audio module 170 may obtain a voice signal through parsing based on the vibration signal that is of the vibration bone of the vocal part and that is obtained by the bone conduction sensor 180M, to implement a voice function. The application processor may parse heart rate information based on the blood pressure beating signal obtained by the bone conduction sensor 180M, to implement a heart rate detection function.

The button 190 includes a power button, a volume button, and the like. The button 190 may be a mechanical button, or may be a touch button. The electronic device 100 may receive a key input, and generate a key signal input related to a user setting and function control of the electronic device 100.

The motor 191 may generate a vibration prompt. The motor 191 may be configured to provide an incoming call vibration prompt or a touch vibration feedback. For example, touch operations performed on different applications (for example, photographing and audio playing) may correspond to different vibration feedback effects. The motor 191 may also correspond to different vibration feedback effects for touch operations performed on different areas of the display 194. Different application scenarios (for example, a time reminder, information receiving, an alarm clock, and a game) may also correspond to different vibration feedback effects. A touch vibration feedback effect may be further customized.

The indicator 192 may be an indicator light, and may be configured to indicate a charging status and a power change, or may be configured to indicate a message, a missed call, a notification, and the like.

The SIM card interface 195 is configured to connect to a SIM card. The SIM card may be inserted into the SIM card interface 195 or removed from the SIM card interface 195, to implement contact with or separation from the electronic device 100. The electronic device 100 may support one or N SIM card interfaces, where N is a positive integer greater than 1. The SIM card interface 195 may support a nano SIM card, a micro SIM card, a SIM card, and the like. A plurality of cards may be simultaneously inserted into a same SIM card interface 195. The plurality of cards may be of a same type or of different types. The SIM card interface 195 may be compatible with different types of SIM cards. The SIM card interface 195 may also be compatible with an external storage card. The electronic device 100 interacts with a network through the SIM card, to implement functions such as calling and data communication. In some embodiments, the electronic device 100 uses an eSIM, namely, an embedded SIM card. The eSIM card may be embedded in the electronic device 100, and cannot be separated from the electronic device 100.

Figure 2:
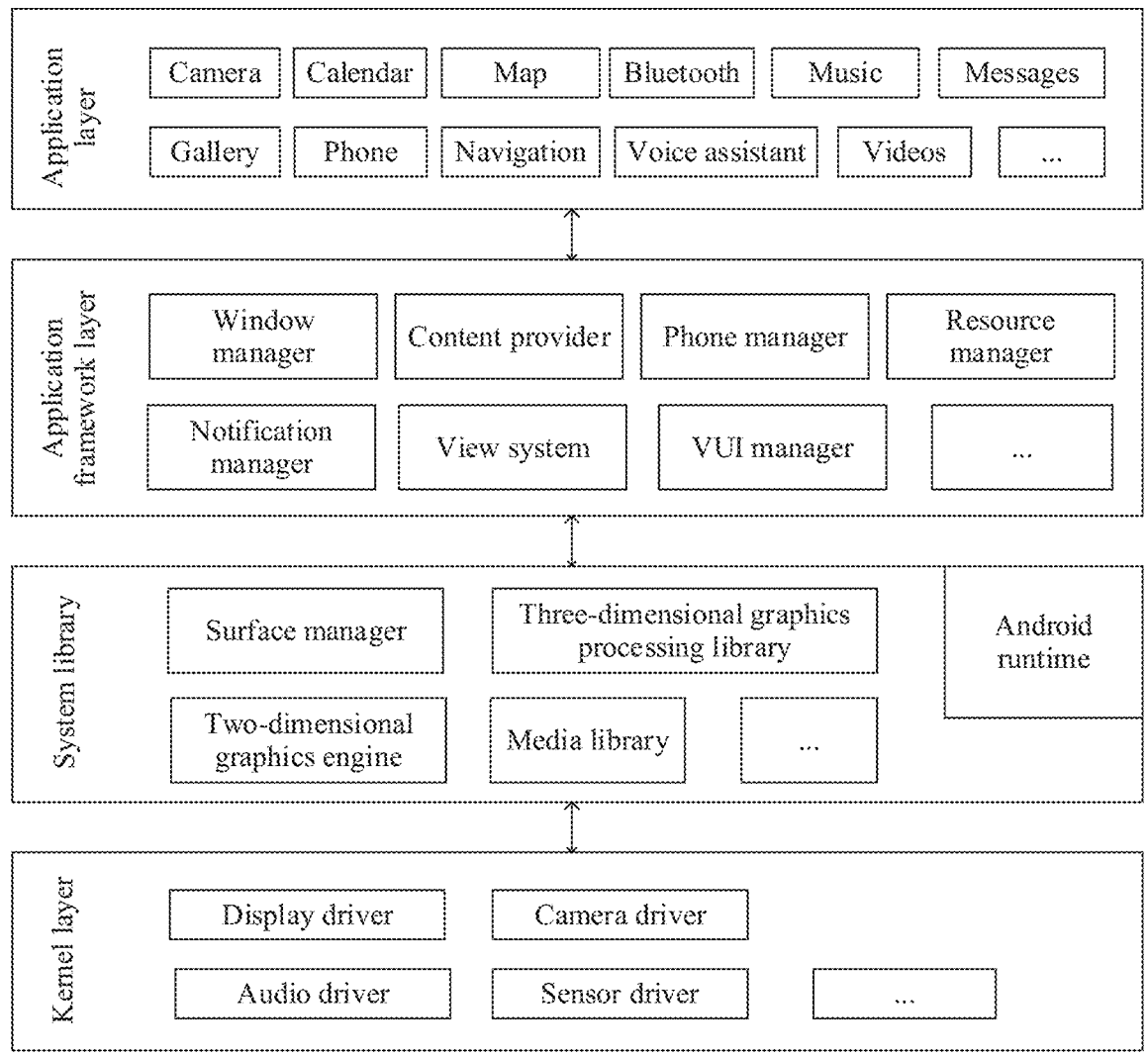
FIG. 2 is a schematic architectural diagram of an operating system in an electronic device according to an embodiment of this application.

FIG. 2 is a block diagram of a software structure of the electronic device 100 according to this embodiment of this application.

In a layered architecture, software is divided into several layers, and each layer has a clear role and task. The layers communicate with each other through a software interface. In some embodiments, an Android system is divided into four layers, that is, an application layer, an application framework layer, an Android runtime (Android runtime) and system library, and a kernel layer from top to bottom.

The application layer may include a series of application packages.

As shown in FIG. 2, the application packages may include applications such as Camera, Gallery, Calendar, Phone, Map, Navigation, Bluetooth, Music, Videos, and Messages.

In this embodiment of this application, the application layer may further include a voice APP having a speech recognition function. The voice APP may also be sometimes referred to as a voice assistant APP, for example, a voice assistant Xiao E, Mi AI, or Siri.

After the voice APP is opened, a voice control signal sent by a user may be collected, and the voice control signal is converted into a corresponding voice task. Further, the voice APP may invoke an interface of a related application to complete the voice task, so that the user controls the electronic device through a voice.

The application framework layer provides an application programming interface (application programming interface, API) and a programming framework for an application at the application layer. The application framework layer includes some predefined functions.

As shown in FIG. 2, the application framework layer may include a window manager, a content provider, a view system, a phone manager, a resource manager, a notification manager, and the like.

The window manager is configured to manage a window program. The window manager may obtain a size of a display, determine whether there is a status bar, perform screen locking, take a screenshot, and the like.

The content provider is configured to: store and obtain data, and enable the data to be accessed by an application. The data may include a video, an image, audio, calls that are made and received, a browsing history and a browsing bookmark, a phone book, and the like.

The view system includes visual controls such as a control for displaying a text and a control for displaying a picture. The view system may be configured to construct an application. A display interface may include one or more views. For example, a display interface including a Messages notification icon may include a text display view and a picture display view.

The phone manager is configured to provide a communication function of the electronic device 100, for example, management of a call status (including answering, declining, or the like).

The resource manager provides various resources for an application such as a localized character string, an icon, a picture, a layout file, and a video file.

The notification manager enables an application to display notification information in a status bar, and may be configured to convey a notification message. The notification manager may automatically disappear after a short pause without user interaction. For example, the notification manager is configured to: notify download completion, provide a message notification, and the like. The notification manager may alternatively be a notification that appears in a top status bar of the system in a form of a graph or a scroll bar text, for example, a notification of an application running on the background or a notification that appears on a screen in a form of a dialog window. For example, text information is prompted in the status bar, a prompt tone is produced, the electronic device vibrates, or an indicator light blinks.

The Android runtime includes a core library and a virtual machine. The Android runtime is responsible for scheduling and management of the Android system.

The core library includes two parts: a function that needs to be invoked in Java language and a core library of Android.

The application layer and the application framework layer run on a virtual machine. The virtual machine executes Java files at the application layer and the application framework layer as binary files. The virtual machine is configured to implement functions such as object lifecycle management, stack management, thread management, security and exception management, and garbage collection.

The system library may include a plurality of functional modules, for example, a surface manager (surface manager), a media library (Media Libraries), a three-dimensional graphics processing library (for example, OpenGL ES), and a 2D graphics engine (for example, SGL).

The surface manager is configured to: manage a display subsystem and provide fusion of 2D and 3D layers for a plurality of applications.

The media library supports playback and recording in a plurality of commonly used audio and video formats, static image files, and the like. The media library may support a plurality of audio and video coding formats, for example, MPEG-4, H.264, MP3, AAC, AMR, JPG, and PNG.

The three-dimensional graphics processing library is configured to implement three-dimensional graphics drawing, image rendering, composition, layer processing, and the like.

The 2D graphics engine is a drawing engine for 2D drawing.

The kernel layer is a layer between hardware and software. The kernel layer includes at least a display driver, a camera driver, an audio driver, a sensor driver, and the like. This is not limited in this embodiment of this application.

Figure 3:
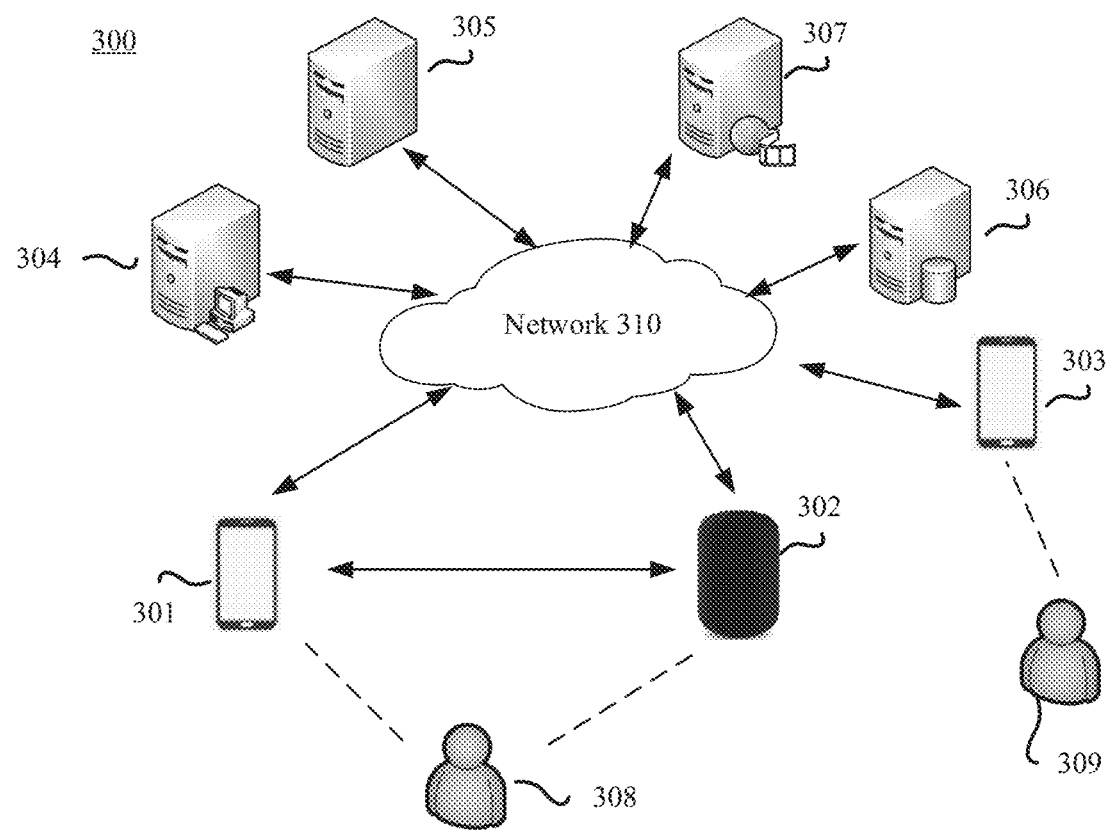
FIG. 3 is a schematic diagram of an implementation scenario of adding a smart home device according to an embodiment of this application.

The following describes, in detail with reference to accompanying drawings, a method for adding a smart home device provided in an embodiment of this application. FIG. 3 is a schematic diagram of a use scenario of adding a smart home device according to an embodiment of this application.

This embodiment of this application provides an electronic system 300. The electronic system 300 may include one or more electronic devices. For example, a first electronic device 301 may be a smartphone, a second electronic device 302 may be a smart speaker, and a third electronic device 303 may be another smartphone.

The electronic device 301 may be connected to the electronic device 302 (for example, in a wired or wireless manner) through one or more networks 310. For example, the one or more communications networks 309 may be a local area network, or may be a wide area network (wide area network, WAN), for example, the internet.

The electronic system 300 may further include a device management server 304. The device management server 304 is configured to manage at least one registered electronic device (for example, the electronic device 301 and the electronic device 302). For example, when the electronic device 301 sends an access request to the device management server 304 through the network 310, the device management server 304 may perform authentication on the electronic device (for example, verify whether an account and a password match). After the authentication succeeds, the device management server 304 may allow the electronic device 301 to access data that is stored in the device management server 304 and that corresponds to the electronic device 301, and the like. For another example, the device management server 304 configures storage space for the electronic devices (301 and 302). In this way, the electronic devices (301 and 302) may send, to the device management server 304 through the network 310, data (for example, a picture, a video, and audio) stored in memories of the electronic devices (301 and 302), and then the device management server 304 stores the received data in the storage space configured for the electronic devices (301 and 302). For example, the device management server 304 may further perform parameter configuration on the electronic device (301 or 302) through the network 310.

The account may refer to a credential used by the electronic device to log in to the device management server 304. The electronic devices (301 and 302) need to log in to the device management server 304 by using a same account, so as to use some functions of the electronic devices. For example, the electronic device needs to log in by using an account, so as to use functions such as contact synchronization and mobile phone retrieval. The electronic device cannot use the foregoing functions when the electronic device does not log in by using the account. When a user enters an account and a password on the electronic device for login, verification information may be sent to the device management server 304 through the network 310 for verification. It may be understood that because the device management server is mainly configured to perform authentication on an account of an electronic device, the device management server (for example, a cloud server) may know which electronic devices log in by using a same account.

In some embodiments, the electronic device 301 and the electronic device 302 may be two different electronic devices that are of a same user 308. For example, the user 308 is Angel's mother. Angel's mother has a smartphone, and also has a voice assistant device (for example, a smart speaker). The smart voice device has a voice assistant system (the voice assistant system is described in detail in the following embodiments). The voice assistant device may receive a voice input of a user and perform a function such as analysis on the language input. The two electronic devices can access the device management server 304 by using an account (for example, HUAWEI-01) of Angel's mother. The device management server 304 may manage a plurality of accounts, and may manage an access right to an electronic device corresponding to each account. In addition, two or more electronic devices managed by the device management server 304 may also simultaneously log in by using a same account. In this way, a first electronic device (for example, the electronic device 301) and a second electronic device (for example, the electronic device 302) that log in by using a same account may implement data exchange or the like by using the device management server 304. It may be understood that the user 308 may use another electronic device to log in to the device management server 304 by using the foregoing account, and adjust an access right of the electronic device that is stored in the device management server 304, for example, refuse permission for the electronic device 301 to log in by using the account HUAWEI-01 or grant permission for another electronic device to log in by using the foregoing account.

For example, Table 1 shows some information about logged-in electronic devices that is stored in the device management server 304. It can be learned from Table 1 that two electronic devices (whose device names are a mobile phone 301 and a smart speaker 302) log in to the device management server 304 by using a same account (HUAWEI-01). When logging in to the device management server 304, the two electronic devices may carry respective device identifiers (for example, IMEIs in Table 1). Alternatively, after the electronic devices log in, the device management server 304 requests corresponding device identifiers of the electronic devices from the electronic devices, to subsequently manage the electronic devices. The device identifier is used to uniquely identify an electronic device, so that another electronic device or a server in a network identifies the electronic device. A common device identifier includes an international mobile equipment identity (international mobile equipment identity, IMEI), an international mobile subscriber identity (international mobile subscriber identity, IMSI), a mobile equipment identifier (mobile equipment identifier, MEID), a serial number (serial number, SN), an integrate circuit card identity (Integrate circuit card identity, ICCID), a media access control (media access control, MAC) layer address, another identifier that can uniquely identify an electronic device, or the like. In this way, although different electronic devices log in by using a same account, the device management server 304 may identify these electronic devices by using different device identifiers.

TABLE 1

| Account | Device name | Device identifier (for example, an IMEI) | Remark |
|---|---|---|---|
| HUAWEI-01 | Mobile phone 301 | 123456789111111 | Last login time: 20:19, 27 Feb. 2019 |
|  | Smart speaker 302 | 123456789222222 | Last login time: 18:26, 27 Feb. 2019 |
| HUAWEI-02 | Mobile phone 303 | 123456789999999 | Last login time: 20:30, 27 Feb. 2019 |

TABLE 1-continued

In some embodiments, the mobile phone 301 or the smart speaker 302 may perform voice communication, for example, make a VoIP call to, with the mobile phone 303 through the network 310. The mobile phone 303 may log in to the device management server 304 by using a second account (for example, HUAWEI-02 in Table 1).

In some embodiments, the electronic system 300 may further include a voice assistant server 306. The voice assistant server 306 may communicate with an external service (for example, a streaming media service, a navigation service, a calendar service, a phone service, or a photo service) through the network 310, to complete a task or collect information. The voice assistant server 306 may be a part of a voice assistant system (not shown in the figure), and the voice assistant system may be implemented based on a client/server model. For example, the voice assistant system may include a client side part (for example, a voice assistant client Huawei Xiao E) executed on an electronic device (for example, the electronic device 302 in FIG. 3) and a server side part (for example, the voice assistant system) executed on the voice assistant server 306. The voice assistant client may communicate with the voice assistant system through the network 310. The voice assistant client provides input and output processing for client side functions and communication with the voice assistant system on a server side. The voice assistant system may provide a server side function for one or more voice assistant clients, and the one or more voice assistant clients are respectively located on corresponding electronic devices (for example, the electronic device 301 and the electronic device 302).

In some embodiments, both the mobile phone 301 and the smart speaker 302 may have a voice communication function. For example, the mobile phone 301 and the smart speaker 302 may provide a VoIP service. In this case, as shown in FIG. 3, the electronic system 300 may further include a VoIP server 305. The VoIP server 305 may be configured to implement voice communication-related services such as calling, answering, three-way calling, and call transfer of the VoIP service. In this way, the mobile phone 301 (or the smart speaker 302) may perform, by using the VoIP server 305, voice communication with another electronic device having a voice communication function.

Figure 4:
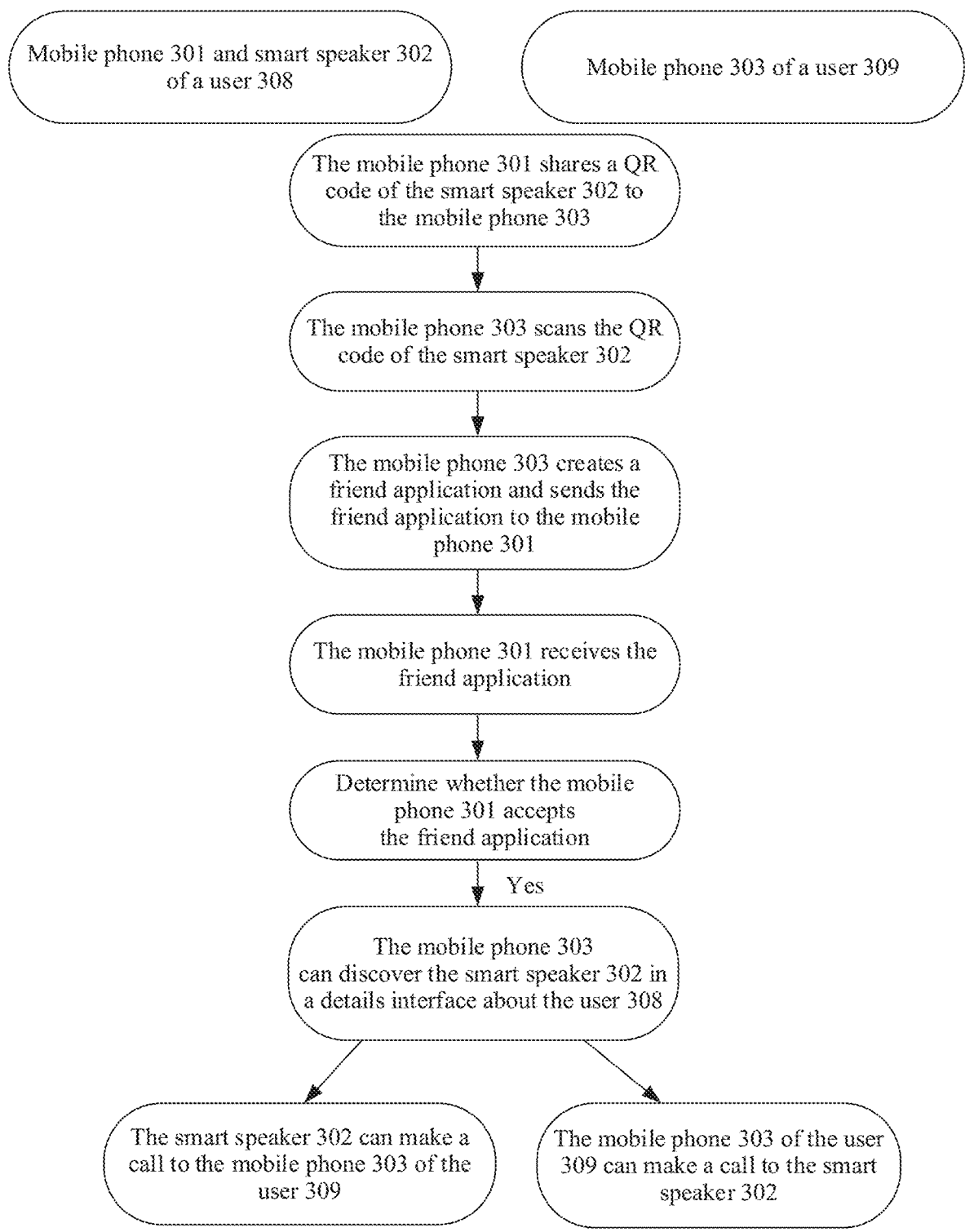
FIG. 4 is a schematic flowchart of a method for adding a smart home device according to an embodiment of this application.

In some embodiments, FIG. 4 is a schematic diagram of a method for adding a smart home device according to an embodiment of this application. The smart home device is a device having a voice call function, and includes a device that can perform an audio or video call function. For example, a call module is built in the smart home device (for example, a fixed number is allocated to the smart home device), so that the smart home device can make a call through a cellular network. Alternatively, a simplified FaceTime module or a simplified WeChat module is built in the smart home device, and can support the smart home device in performing a data network-based audio or video call. For example, the smart home device includes a smart speaker, a smart television, a robotic vacuum cleaner, a story machine, a smart robot, a smart rice cooker, a smart desk lamp, and a smart charger, but does not include a mobile phone, a tablet computer, and a notebook computer. Referring to FIG. 4, the mobile phone 301, the mobile phone 303, and the smart speaker 302 may all have a voice communication function. For example, the mobile phone 301, the mobile phone 303, and the smart speaker 302 may provide a VoIP service. Both the mobile phone 301 and the smart speaker 302 log in by using an account of a user 308, and the mobile phone 303 logs in by using an account of a user 309. The user 309 uses the mobile phone 303 to scan an identification code (for example, a QR code) of the smart speaker 302, and to send a friend application to the mobile phone 301 of the user 308. The mobile phone 301 receives the friend application sent by the mobile phone 303, and accepts the application through approval. In this way, the smart speaker 302 can make a call to the mobile phone 303, for example, a VoIP call. The VoIP call includes a FaceTime video call, a WeChat voice call or video call, a VoLTE call, or the like. The smart speaker 302 can make a call to the mobile phone 303, or the mobile phone 303 can directly make a call to the smart speaker 302.

Further, the voice assistant server 306 may provide a speech recognition result for the VoIP server 305. For example, after Angel's mother enters a voice signal "call angel" to the smart speaker 302, the smart speaker 302 may send the collected voice signal to the voice assistant server 306 for speech recognition. The voice assistant server 306 recognizes that a control instruction corresponding to the voice signal is calling the contact Angel. Further, the voice assistant server 306 may send an instruction for calling the contact Angel to the VoIP server 305. In response to the instruction, the VoIP server 305 may initiate a voice call request to an electronic device (for example, a mobile phone) of Angel. After accepting the voice call request, Angel may establish a voice call between the smart speaker 302 and the mobile phone of Angel, to implement a VoIP service. In addition, the smart speaker 302 may also provide a speech recognition result for the VoIP server 305 according to a local voice processing instruction, so that the smart speaker 302 establishes voice communication with another electronic device having a voice communication function.

In some other embodiments, after the mobile phone 301 and the smart speaker 302 log in by using a same account, when the mobile phone 301 performs a voice call service (for example, the VoIP service or a voice call in a cellular network), if the user 308 expects to switch this voice call service to the smart speaker 302, the user 308 may perform a preset specific operation such as a specific gesture or a specific voice input on the mobile phone 301 or the smart speaker 302, to trigger the VoIP server 305 to switch the voice call service on the mobile phone 301 to the smart speaker 302, so that the voice call service continues being performed on the smart speaker 302. Correspondingly, when the smart speaker 302 is making a voice call, the user 308 may also perform a preset specific operation on the mobile phone 301 or the smart speaker 302, to trigger the VoIP server 305 to switch the voice call service on the smart speaker 302 to the mobile phone 301, so that the voice call service continues being performed on the mobile phone 301. To be specific, in the foregoing embodiment, the user 308 only needs to perform the foregoing specific operation on the electronic device, so that the VoIP server 305 can automatically switch the voice call service that is being performed from the first electronic device to the second electronic device. In this way, a phenomenon of interruption to the voice call service does not occur in an entire switching process, and the user does not need to repeatedly perform an operation between a plurality of electronic devices, so that efficiency of voice switching between the plurality of electronic devices and use experience of the user are improved.

In this embodiment of this application, in addition to the voice call service, a video call service may also be switched. The service switching may be performed by a server (for example, the VoIP server 305), may be performed by the first electronic device, or may be performed by the second electronic device.

In some other embodiments, after the mobile phone 301 and the smart speaker 302 log in by using a same account (for example, HUAWEI-01), when the mobile phone 301 is playing audio/a video, if the user 308 expects to switch the audio/video that is being played to the smart speaker 302 for continuous playing (for example, continue a current playing progress on the device after the switching), the user 308 may perform a preset input operation on the mobile phone 301 or the smart speaker 302, to trigger a content server 307 to switch the audio/video service that is being played on the mobile phone 301 to the smart speaker 302 for continuous playing. Similarly, when the smart speaker 302 performs an audio/video service, the user 308 may also perform a preset input operation on the mobile phone 301 or the smart speaker 302, to trigger the content server 307 to switch the audio/video that is being played on the smart speaker 302 to the mobile phone 301 for continuous playing. Optionally, the audio/video switching may be performed by the content server 307, may be performed by the mobile phone 301, or may be performed by the smart speaker 302.

It should be noted that in addition to the mobile phone 301, the first electronic device and the third electronic device each may be an electronic device supporting an audio/video service or a voice call service, for example, a tablet computer, a wearable electronic device (for example, a smartwatch) having a wireless communication function, or a virtual reality device. A specific form of the first electronic device is not particularly limited in the following embodiments. In addition to the smart speaker 302, the second electronic device may be an electronic device supporting an audio/video service, for example, a smart television, a tablet computer, a notebook computer, or a desktop computer. A specific form of the second electronic device is not particularly limited in the following embodiments. In some embodiments, the first electronic device may be a mobile phone, and the second electronic device may be a smart speaker or a notebook computer having a voice assistant system.

The following describes, in detail with reference to accompanying drawings, a method for adding a smart home device to contacts provided in an embodiment of this application.

For example, the mobile phone 301 is used as a first electronic device, the smart speaker 302 is used as a second electronic device, and the mobile phone 303 is used as a third electronic device. A VoIP service is used as an example. In some application scenarios, in this embodiment of this application, the mobile phone 301 and the smart speaker 302 may log in by using a same account (for example, log in by using an account of Angel's mother). A VoIP service is activated for the account and the account is bound to a VoIP call number. In this case, Angel's mother may perform the VoIP service with another electronic device by using the smart speaker 302 (in a case in which the another electronic device has activated a VoIP call service and is bound to a VoIP call number). For example, the account is a Huawei account, and the Huawei account may be bound to a plurality of VoIP call numbers.

Figure 5:
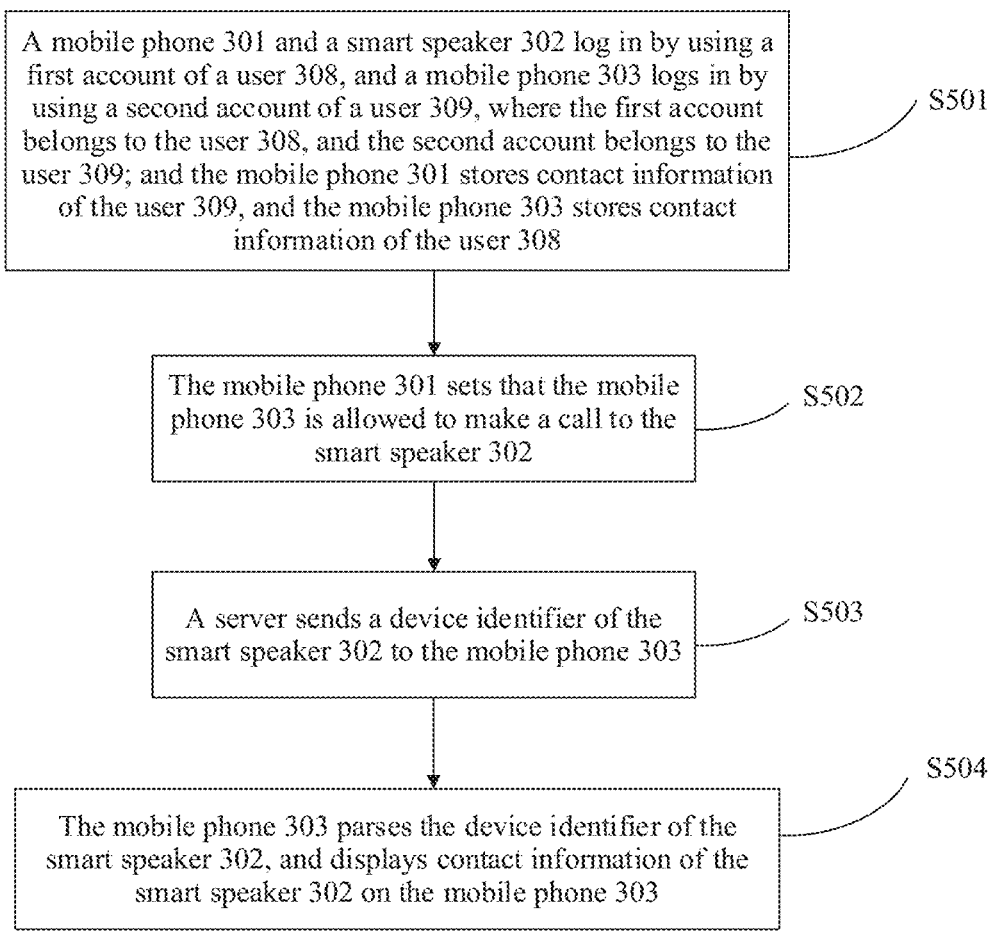
FIG. 5 is a schematic flowchart of a method for adding a smart home device according to an embodiment of this application.

FIG. 5 is a schematic flowchart of a method for adding a smart home device according to an embodiment of this application. As shown in FIG. 5, the following scenario is used as an example. The mobile phone 301 is used as a first electronic device, the smart speaker 302 is used as a second electronic device, and the mobile phone 303 is used as a third electronic device. The mobile phone 301 and the smart speaker 302 belong to the user 308, and the mobile phone 303 belongs to the user 309. The mobile phone 301 of the user 308 stores contact information of the user 309, and the mobile phone 303 of the user 309 stores contact information of the user 308. The method may be implemented in the electronic device and the server in the foregoing embodiments, and may include the following steps.

S501: The mobile phone 301 and the smart speaker 302 log in by using a first account of the user 308, and the mobile phone 303 logs in by using a second account of the user 309. The first account belongs to the user 308, and the second account belongs to the user 309. The mobile phone 301 stores the contact information of the user 309, and the mobile phone 303 stores the contact information of the user 308.

The first account (for example, HUAWEI-01) and the second account (for example, HUAWEI-02) each may be an account of an APP (for example, HiCall, Huawei HiLink, WeChat, Sina Weibo, TikTok, or E-mail), may be an account of a service (for example, a Huawei cloud service), or may be a mobile phone number. In addition, the first account (for example, HUAWEI-01) may alternatively be an account of a speaker APP. The foregoing APP may be downloaded from a mobile phone store, or may be pre-installed.

In a possible implementation, the mobile phone 301 establishes a short-distance wireless communication connection to the smart speaker 302, and the mobile phone 301 discovers the smart speaker 302 and binds the smart speaker 302 as a subdevice to the mobile phone 301. For example, both the mobile phone 301 and the smart speaker 302 are connected to a same Wi-Fi network. To be specific, the two electronic devices may access the network by using a same service set identifier (service set identifier, SSID) in a WLAN network. For example, the mobile phone 301 may establish a Bluetooth connection to the smart speaker 302.

In a possible implementation, that the mobile phone 301 and the smart speaker 302 log in by using a first account may be specifically as follows: If HiCall is installed on the mobile phone 301 (HiCall is an APP developed by Huawei or a communication service. When two users install the HiCall application or support a HiCall service, the two users may make a voice or video call to each other), the mobile phone 301 is bound to the smart speaker 302 by using the first account through HiCall. Alternatively, the mobile phone 301 logs in by using the first account, and then the mobile phone 301 scans a QR code, a bar code, or an NFC tag of the speaker 302 to implement login in the speaker 302 by using the first account.

In a possible implementation, that the mobile phone 301 and the smart speaker 302 log in by using a first account may be specifically as follows: If HiCall is installed on both the mobile phone 301 and the smart speaker 302, the user 308 may log in to HiCall by using an account (HUAWEI-01) in HiCall of the mobile phone 301, and the user 308 may also log in to HiCall by using the same account (HUAWEI-01) in HiCall of the smart speaker 302.

In a possible implementation, if both the mobile phone 301 and the smart speaker 302 are electronic devices of a Huawei brand, both the mobile phone 301 and the smart speaker 302 may provide a Huawei cloud service for the user 308. In this case, the user 308 may log in to the device management server 304 of the Huawei cloud service by using the account (HUAWEI-01) in the mobile phone 301, and the user 308 may also log in to the device management server 304 of the Huawei cloud service by using the same account (HUAWEI-01) in the smart speaker 302.

Specifically, the device management server 304 stores the account and device information, for example, the device identifier (shown in Table 1), of an electronic device that logs in by using the account. After both the mobile phone 301 and the smart speaker 302 log in to the device management server 304 by using the same account, the device management server 304 may establish a correspondence between the first account and the electronic device that uses the first account. In this way, the device management server 304 can find specific electronic devices that log in by using a same account.

In a possible implementation, HiCall is installed on the mobile phone 303, or the mobile phone 303 is an electronic device of a Huawei brand. When the mobile phone 303 is the electronic device of the Huawei brand, the mobile phone 303 may provide a Huawei cloud service for the user 309. In this case, the user 309 may log in to the device management server 304 of the Huawei cloud service by using the second account (HUAWEI-02).

In a possible implementation, the device management server 304 receives a binding request sent by the mobile phone 301, where the binding request includes information about the first account used for login in the mobile phone 301 and a device identifier of the smart speaker 302. The device management server 304 queries an owning relationship with the smart speaker 302 based on the device identifier of the smart speaker 302, to obtain an account of the smart speaker. The owning relationship includes a correspondence between the device identifier of the smart speaker 302 and an account of a current owner of the smart speaker 302. A binding relationship between the mobile phone 301 and the smart speaker 302 is established when the first account matches the account of the smart speaker. Optionally, before the binding relationship between the mobile phone 301 and the smart speaker 302 is established when the first account matches the account of the smart speaker, the method further includes: comparing the first account with the account of the smart speaker, and when the first account is the same as the account of the smart speaker, determining that the first account matches the account of the smart speaker.

S502: The mobile phone 301 sets that the mobile phone 303 is allowed to make a call to the smart speaker 302.

In a possible implementation, the user 308 sets a list of users who can make a call to the smart speaker 302. The user 308 may set that all contacts in contacts of the mobile phone 301 are allowed to make a call to the smart speaker 302, may set that a contact that is in a favorites folder or a group (for example, relatives, friends, or classmates) and that is in contacts of the mobile phone 301 is allowed to make a call to the smart speaker 302, may specifically select a specific contact in contacts of the mobile phone 301 to make a call to the smart speaker 302, or may add a new contact that is not in contacts to the list, for example, add the new contact to the list by entering a number (not a number in the contacts) on a dialer of the device and dialing the number.

S503: The server sends the device identifier of the smart speaker 302 to the mobile phone 303.

After the mobile phone 301 and the smart speaker 302 log in by using the first account, the server may directly obtain the device identifier of the smart speaker 302. Optionally, after logging in by using the first account, the mobile phone 301 or the smart speaker 302 may actively send the device identifier of the smart speaker 302 to the server. After the mobile phone 301 sets that the mobile phone 303 is allowed to make a call to the smart speaker 302, the server sends the previously obtained device identifier of the smart speaker 302 to the mobile phone 303.

For the device identifier of the smart speaker 302, refer to Table 1.

S504: The mobile phone 303 parses the device identifier of the smart speaker 302, and displays contact information of the smart speaker 302 on the mobile phone 303.

The contact information may be a name, may be a number, may be a number in an application, or may be a name+a number. For example, the contact information of the smart speaker may be a name of the smart speaker, may be a number of the smart speaker, may be a number of the smart speaker in a specific application, or may be a name+a number of the smart speaker.

Figure 6A:
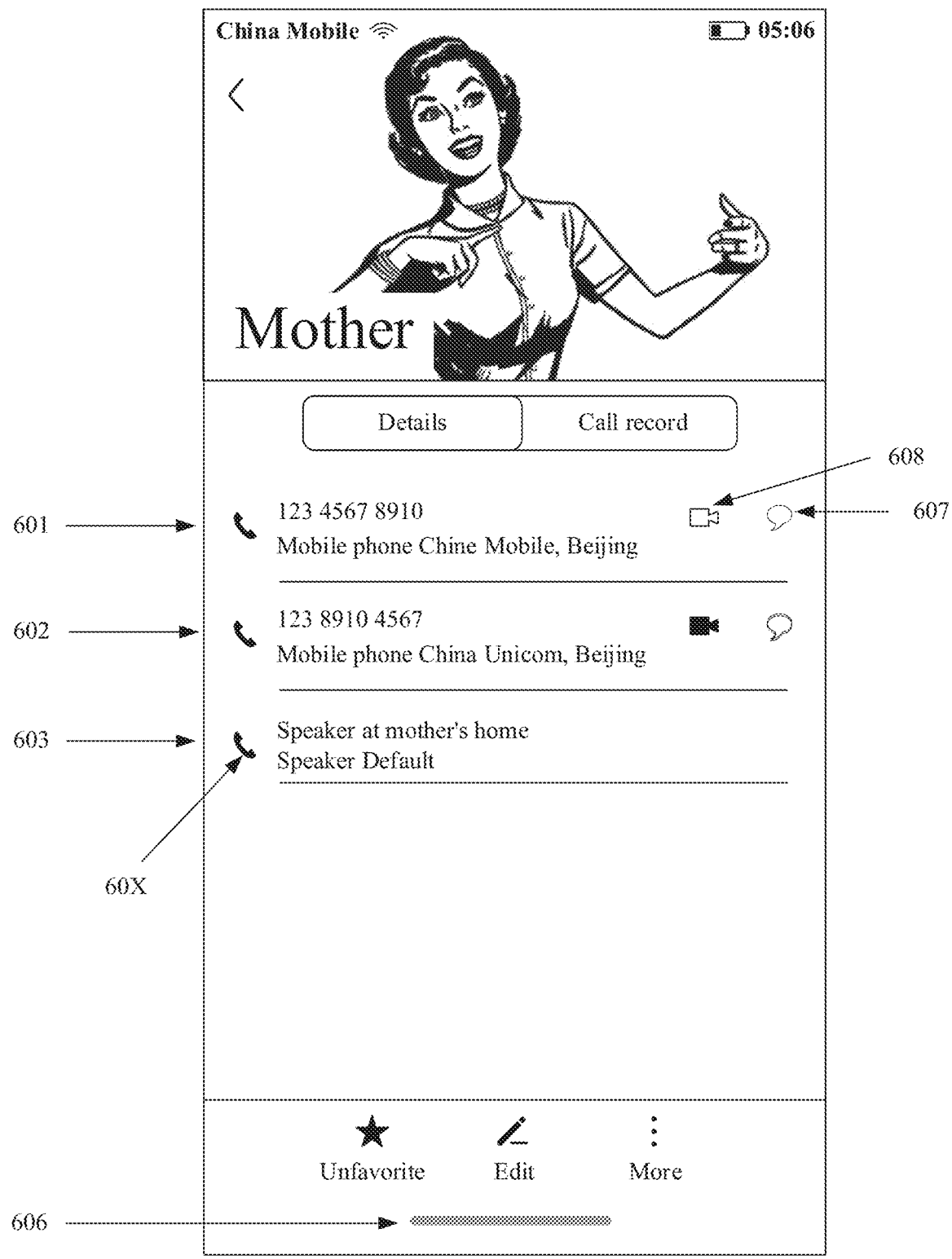
FIG. 6A is a schematic diagram of a scenario of a method for adding a smart home device according to an embodiment of this application.

In a possible implementation, the contact information of the smart speaker 302 is automatically displayed in contacts of the mobile phone 303. Further, the contacts of the mobile phone 303 include contact information of the user 308 (for example, a mobile phone number of the user 308 or a Huawei HiCall number). The contact information of the smart speaker 302 may be displayed below the contact information of the user 308, may be displayed above the contact information of the user 308, or may be displayed in a random sequence. For example, Angel's mother is the user 308, and Angel is the user 309. Angel's mother purchases a new smart speaker 302, and both the smart speaker 302 and the mobile phone 301 of Angel's mother log in by using the first account. The mobile phone 303 of Angel logs in by using the second account. The mobile phone 301 of Angel's mother stores a mobile phone number of Angel, and the mobile phone 303 of Angel stores contact information of Angel's mother. Both information about the first account and information about the second account are stored in the server. After Angel's mother logs in to the mobile phone 301 and the speaker 302 by using the first account, both the mobile phone 301 and the speaker 302 are bound to the first account, and also send related information to the server. After Angel's mother sets, on the mobile phone 301, that Angel is allowed to make a call to the smart speaker 302, the server sends information about the smart speaker 302 to the mobile phone 303 of Angel. Optionally, the server may determine that the user using the first account and the user using the second account are in a friend relationship with each other, and then send information about the smart speaker 302 to the mobile phone 303. For example, the friend relationship means that the server determines that the mobile phone 301 of Angel stores the contact information of Angel's mother and the mobile phone of Angel's mother stores the contact information of Angel. Therefore, in the contacts of the mobile phone 303 of Angel, the contact information of the smart speaker 302 is automatically displayed. For the contact information, refer to 603 in FIG. 6A. FIG. 6A shows a detail page about the mother in the contacts of the mobile phone of Angel. As shown in the figure, in addition to the previously stored operation mobile phone numbers (referring to 601 and 602 in FIG. 6A) of the mother, the contact information (referring to 603 in FIG. 6A) of the smart speaker 302 is automatically displayed. Angel taps a control "Speaker at mother's home" on the mobile phone 303, to directly make a call to the new smart speaker 302 purchased by the mother. The control is a visual graphical interface element presented to the user, and the user may interact with the control by performing an operation such as tapping or sliding. For example, the user may interact with a control in a contacts interface. As shown in FIG. 6A, a control 607 indicates that the user may send an SMS message to the number 601 by using the control, a control 608 indicates that the user may make a video call to the number 601 by using the control, and a control 606 indicates that the user may enter a home screen (home screen) of an operating system by sliding the control upward. Optionally, Angel may set the contact information of the smart speaker 302 in the contacts to be invisible, or set that the smart speaker 302 cannot make a voice call to Angel, for example, add the contact information of the smart speaker 302 to a blacklist.

Further, different types of calls, such as FaceTime and HiCall, may be implemented between the mobile phone 303 of Angel and the mobile phone 301 of Angel's mother. Similar to the contacts of the mobile phone, the contact information of the smart speaker 302 may also be automatically displayed in contacts of an APP of the mobile phone 303. In this way, the user can directly make, by using a control in the contacts of the APP, a call to the new smart speaker 302 purchased by the mother.

Optionally, the contact information of the mother may be stored in the contacts of the mobile phone of Angel, or may be stored in another application of the mobile phone of Angel, for example, Huawei HiCall. The contact information of the mother is stored in the contacts of the mobile phone of Angel, and the contact information of the smart home device of the mother can be directly discovered in the contacts. In this way, an update speed is fast, contact is convenient, and an application does not need to be opened. Therefore, steps are relatively simple, and user experience is improved.

In a possible implementation, contacts of an APP (for example, HiCall) of the mobile phone 303 includes the contact information of the mother. The contact information of the smart speaker 302 is automatically displayed in a contacts interface of HiCall, and may be displayed below the contact information of the mother, may be displayed above the contact information of the mother, or may be displayed in a random sequence.

Figure 6B:
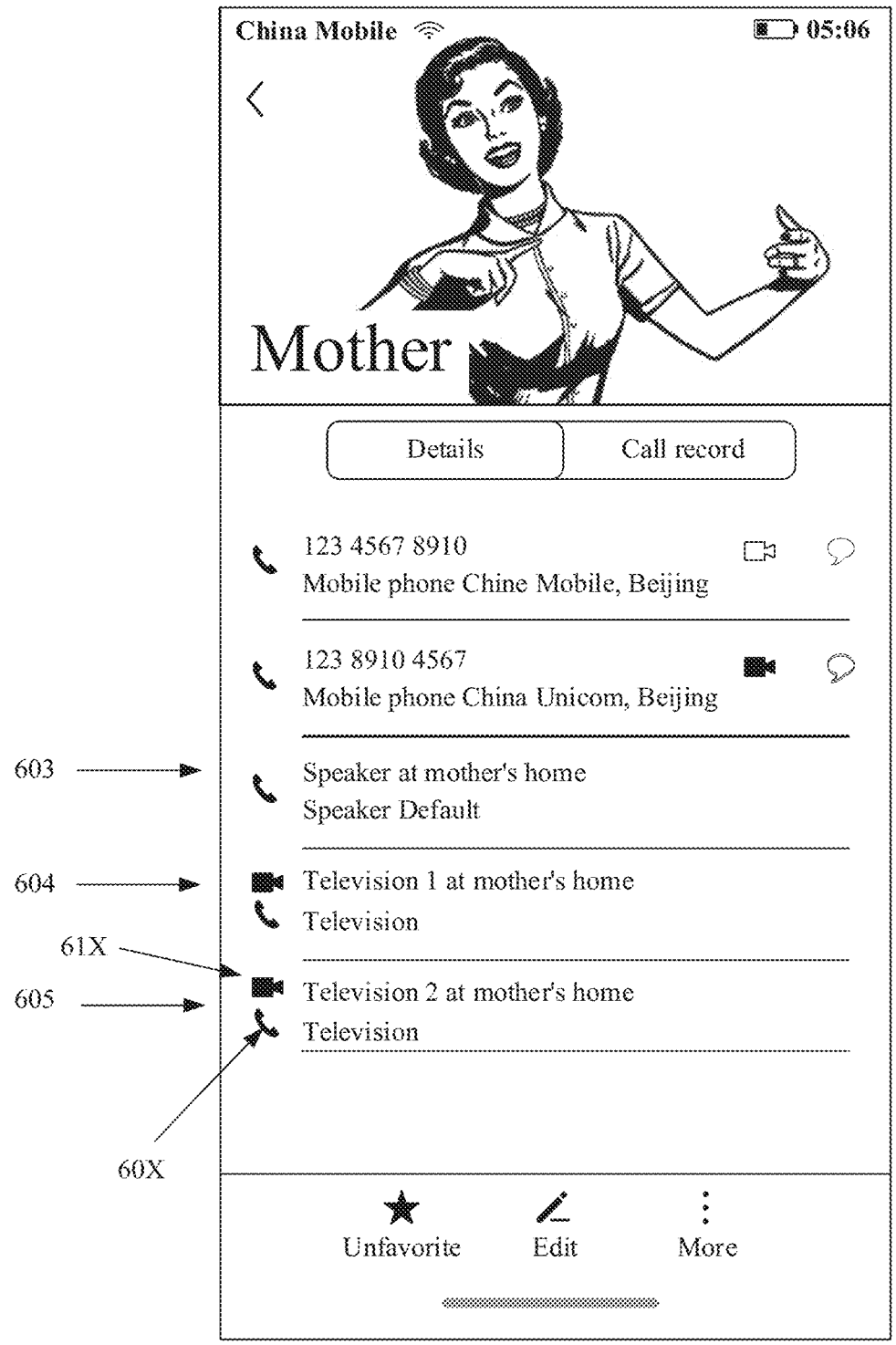
FIG. 6B is a schematic diagram of a scenario of a method for adding a smart home device according to an embodiment of this application.

In a possible implementation, a call type, for example, a control 60X in FIG. 6A, supported by the smart speaker 302 is displayed in a details interface of the contacts based on the call type supported by the smart speaker 302. The control 60X in FIG. 6A indicates that the user may make an audio call to the number 603 by using the control. For example, Angel's mother purchases two smart televisions in addition to the new smart speaker 302. Angel's mother logs in to the two smart televisions by using the first account. The server comprehensively determines that the user using the first account and the user using the second account are in a friend relationship with each other, and sends an identifier of each smart television to the mobile phone 303. Referring to FIG. 6B, controls (for example, 604 and 605 in FIG. 6B) of the two smart televisions are automatically displayed in the contacts of the mobile phone 303 of Angel. In FIG. 6B, a control 60X indicates that the user may make an audio call to the number 605 by using the control, and a control 61X indicates that the user may make a video call to the number 605 by using the control. To be specific, the control 60X and the control 61X indicate that Angel may select a type of a call (the audio call or the video call) to the number 605.

Figure 7A:
FIG. 7A is a schematic diagram of a scenario of a method for adding a smart home device according to an embodiment of this application.

The following uses another embodiment as an example to describe a method for adding a smart home device provided in an embodiment of the present invention. FIG. 7A shows that only a mobile phone number of Angel's aunt and HiCall enabled by Angel's aunt are displayed in a details interface about Angel's aunt in a contact application in the mobile phone of Angel. One day, Angel's aunt bought a television for herself.

After Angel's aunt purchases the new smart television, FIG. 7B(1) to FIG. 7B(4) show a process in which the aunt sets, for the smart television, a person who can make a call to the smart television. After purchasing the smart television, Angel's aunt first binds a mobile phone of the aunt to the newly purchased smart television (for example, logs in by using a same account). It is considered by default that only the aunt can make a call to the smart television. In addition, the aunt may further set a person who can make a call to the smart television device. For example, the aunt may select "Angel" and "Bill" from contacts and allow "Angel" and "Bill" to make a call to the smart television of the aunt. If a mobile phone of Angel and a mobile phone of Bill enable a VoIP service, both the mobile phone of Angel and the mobile phone of Bill can make a call to the smart television of the aunt to establish a video call or an audio call. In a possible implementation, when setting a person who can make a call to the device (for example, the smart television), the aunt may also directly enter a mobile phone number for addition.

Further, after the aunt binds the mobile phone to the smart television, the mobile phone of the aunt sends identification information of the smart television to the server. After the aunt sets that "Angel" and "Bill" can make a call to the smart television, the mobile phone of the aunt sends, to the server, information that "Angel" and "Bill" can make a call to the smart television. The server determines whether "Angel" and "Bill" enable a VoIP service. If "Angel" and "Bill" enable the VoIP service, the server sends the identification information of the smart television to the mobile phone of Angel and the mobile phone of Bill. Alternatively, the server may directly send the identification information of the smart television to the mobile phone of Angel and the mobile phone of Bill without determining whether "Angel" and "Bill" enable a VoIP service. Descriptions are provided below by using the mobile phone of Angel as an example.

Figure 7C:
FIG. 7C is a schematic diagram of a scenario of a method for adding a smart home device according to an embodiment of this application.

After receiving the identifier of the smart television, the mobile phone of Angel automatically adds the contact information of the smart television to the details interface about the aunt in the contact application. Optionally, the contact information of the smart television of the aunt and the mobile phone number of the aunt are displayed in a same interface, and the contact information of the smart television may be displayed below or above the mobile phone number. For example, as shown in FIG. 7C, the contact information of the smart television of the aunt is displayed below the mobile phone number in the details interface about the aunt in the contact application in the mobile phone of Angel.

Figure 7E:
FIG. 7E is a schematic diagram of a scenario of a method for adding a smart home device according to an embodiment of this application.

Further, optionally, the aunt also purchases a smart speaker, and logs in to the smart speaker by using an account the same as that of the mobile phone and the smart television, to bind the smart speaker to the mobile phone and the smart television. The mobile phone of the aunt sends an identifier of the smart speaker to the server. In the step of "Who can make a call to this device" shown in FIG. 7B (1), as shown in FIGS. 7D(1) and FIG. 7D(2), the aunt selects "Angel" again. The mobile phone of the aunt sends information that "Angel" is selected to the server, and the server determines whether Angel enables a VoIP service. If Angel enables the VoIP service, the server sends identification information of the smart speaker to the mobile phone of Angel. The mobile phone of Angel receives the identification information of the smart speaker, and parses the identification information. Therefore, the mobile phone of Angel automatically adds contact information of the smart speaker to the details interface about the aunt in the contact application. Optionally, the contact information of the smart television of the aunt, the contact information of the smart speaker of the aunt, and the mobile phone number of the aunt are automatically displayed in a same interface. For example, as shown in FIG. 7E, the contact information of the smart television of the aunt and the contact information of the smart speaker of the aunt are displayed below the mobile phone number. Video and audio icons are displayed before the smart television, and indicate that the smart television has both a video function and an audio function. An audio icon is displayed before the smart speaker, and indicates that the smart speaker has an audio function.

Further, optionally, the aunt deletes "Angel" from a list of persons that can make a call to the smart speaker. Therefore, a details interface about the contact aunt in the mobile phone of Angel is restored to that shown in FIG. 7C.

Figure 8:
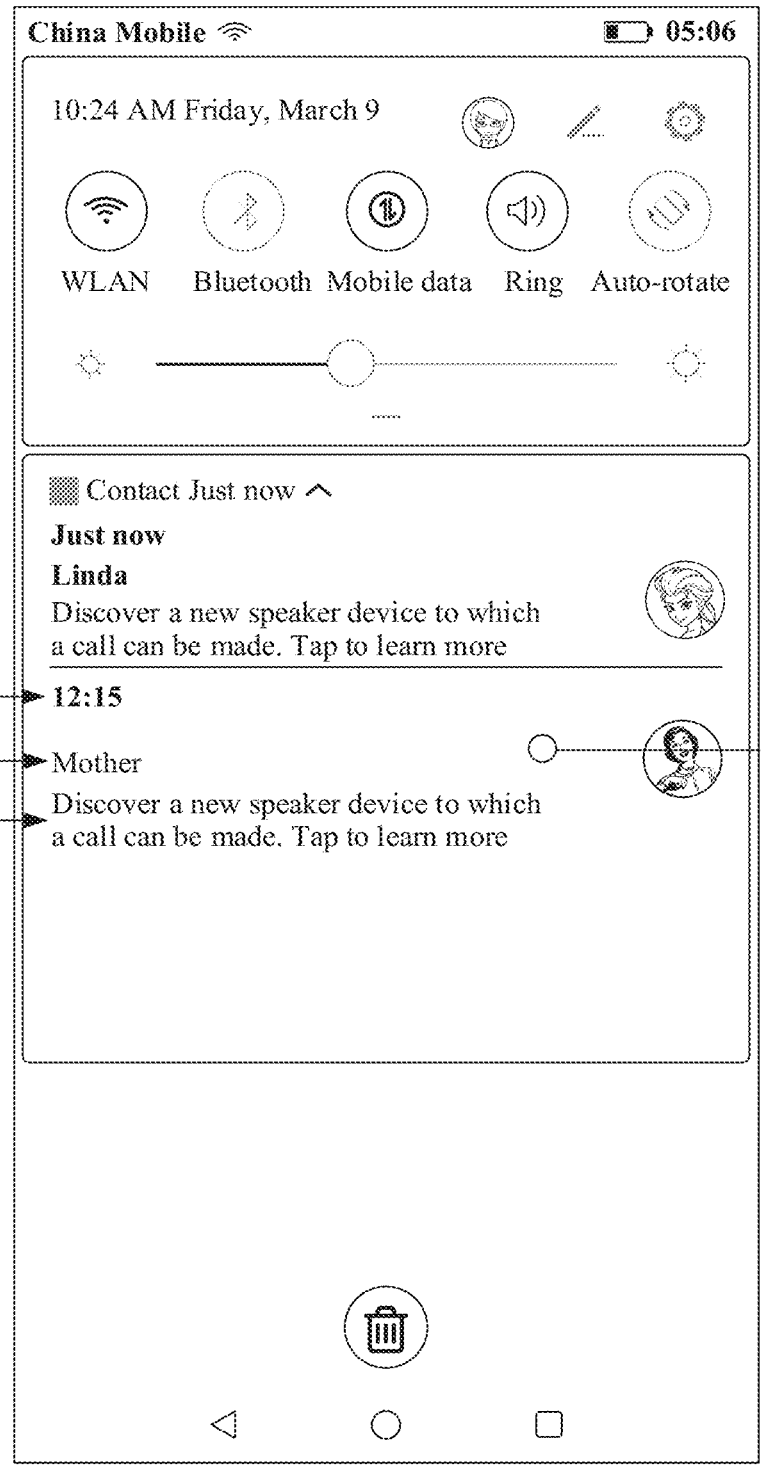
FIGS. 8(1) and FIG. 8(2) are a schematic diagram of a scenario of a method for adding a smart home device according to an embodiment of this application.
Figure 8:

In a possible implementation, after the server sends the identifier of the smart speaker 302 to the mobile phone 303, before the contact information of the smart speaker 302 is automatically added to the mobile phone 303, the method further includes: displaying a notification message on the mobile phone 303, to prompt the user 309 whether the contact information of the smart speaker 302 is allowed to be added to the mobile phone 303. Optionally, the notification message may be displayed in a form of a banner to notify the user 309. Alternatively, FIG. 8(1) shows that the notification message may be displayed in an interface obtained after a notification panel of the mobile phone of Angel is pulled down, where 801 indicates time, for example, "12:15", of the notification message, 802 indicates a person, for example, "Mother", whose contact details are changed, and 803 indicates a specific event type, for example, "Discover a new speaker device to which a call can be made. Tap to learn more". If the message is tapped, the mobile phone jumps from the interface shown in FIG. 8(1) to an interface shown in FIG. 8(2), that is, displays a details interface about the mother in the contact application.

Figure 9:
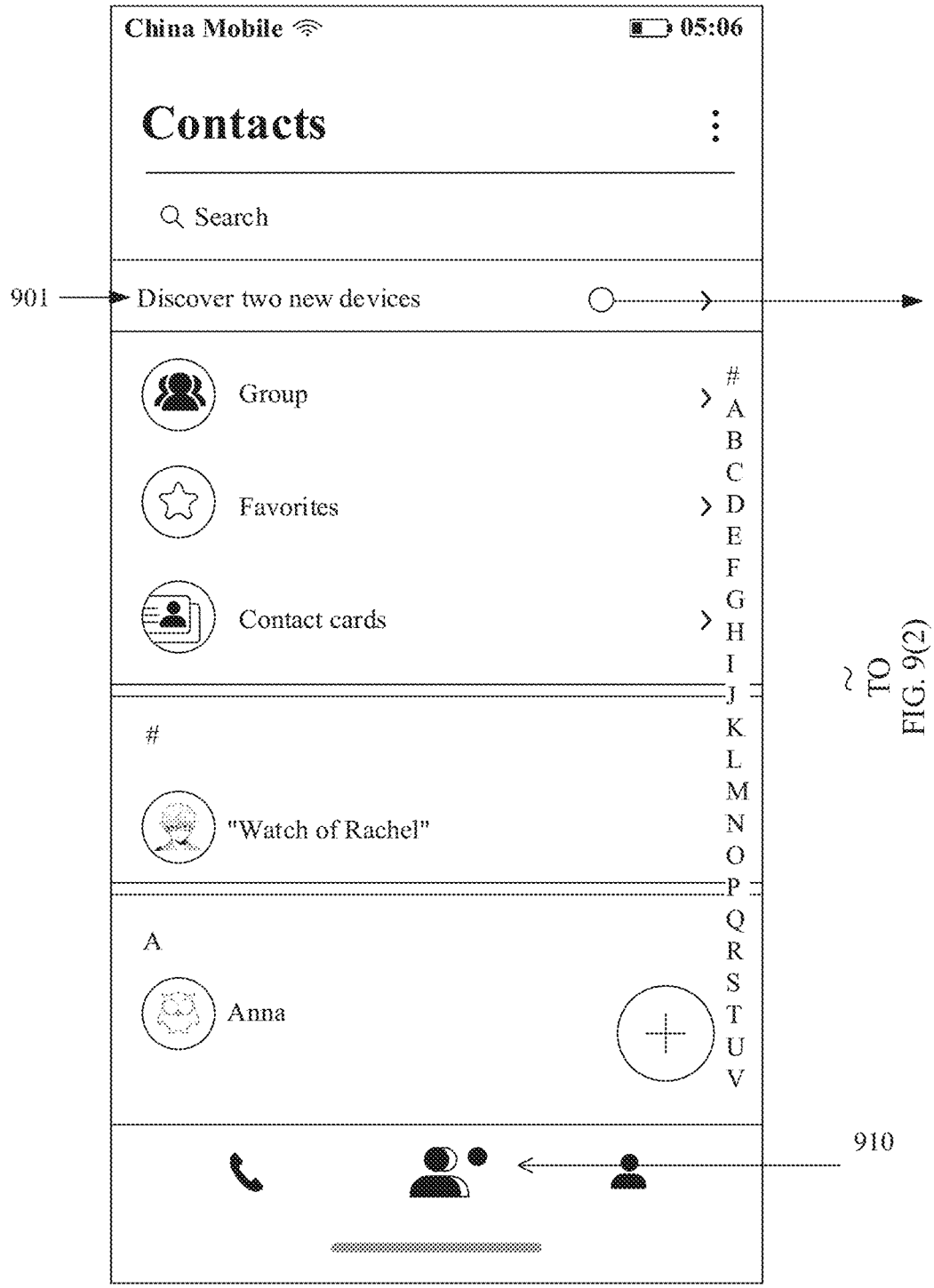
FIGS. 9(1), FIGS. 9(2), and FIG. 9(3) are a schematic diagram of a scenario of a method for adding a smart home device according to an embodiment of this application.
Figure 9:
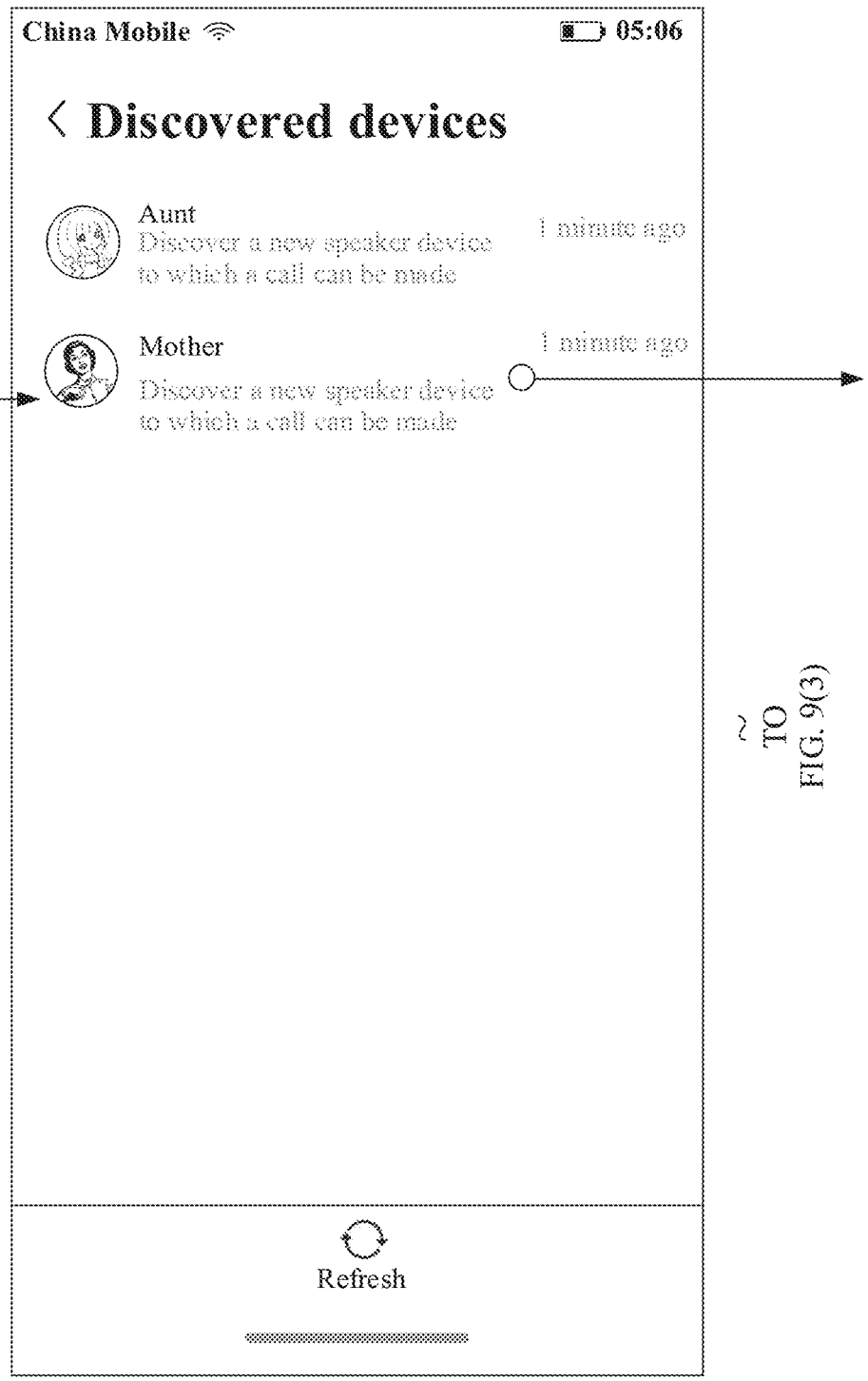
Figure 9:
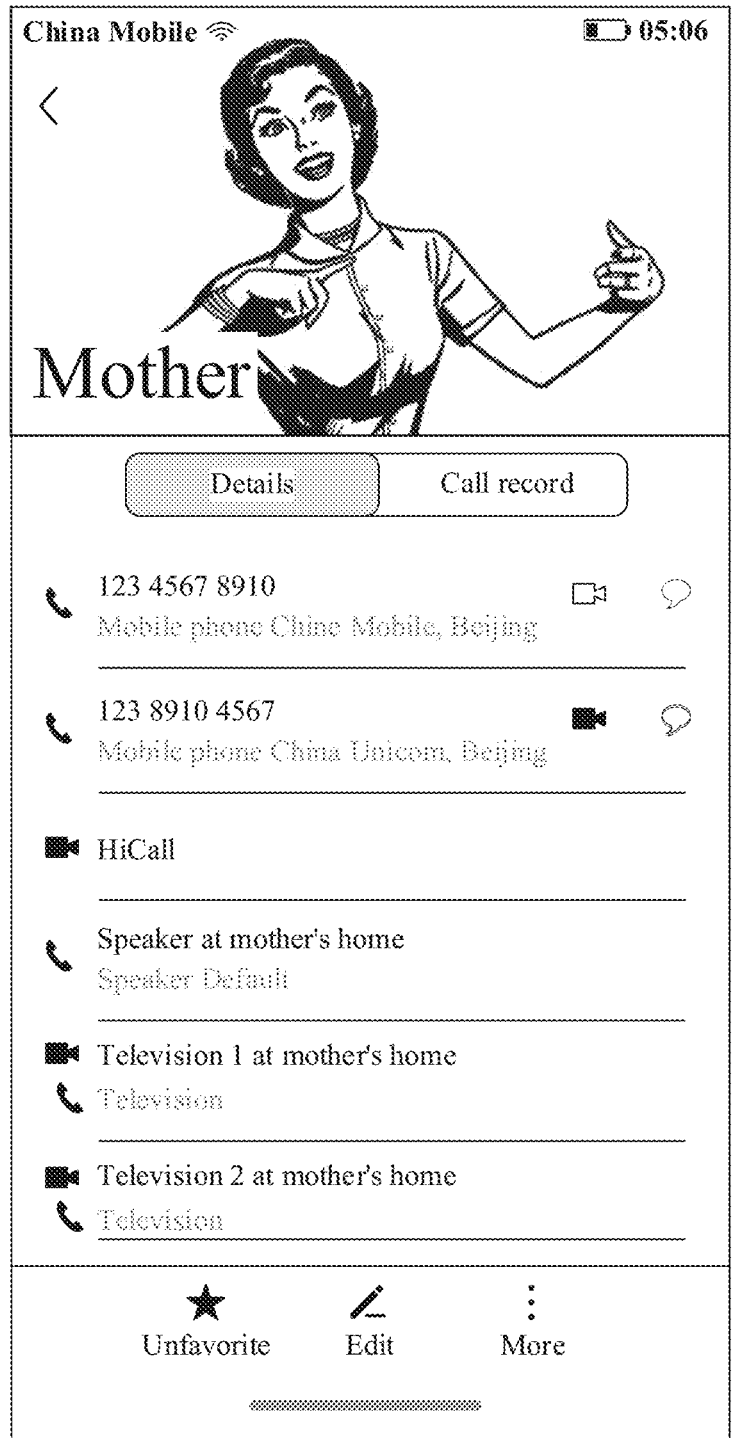

In a possible implementation, the prompt information may alternatively be provided for the user in a manner other than a manner of displaying the message, for example, in a form of a control in a contact interface. Details are described by using an example. Referring to FIG. 9(1) to FIG. 9(3), a control is displayed on a page of a contact application shown in FIG. 9(1), to prompt the user that a friend of the user is bound to a smart home device, and the control may be 901 "Discover two new devices" shown in FIG. 9(1). A device discovery page shown in FIG. 9(2) may be entered by tapping the notification message. For example, the page displays specific discovered devices. Optionally, the page may further display all historically discovered smart home devices. Optionally, the page may alternatively display only a newly added device. Further, if the user taps a control on the page shown in FIG. 9(2), for example, a control 902 shown in FIG. 9(2), the mobile phone jumps to a details interface about the mother that is shown in FIG. 9(3), and displays contact details of the mother. A control 910 shown in FIG. 9(1) is around a Contacts icon, for example, a small dot in an upper right corner, and indicates that a new message or a new contact is discovered. For the sake of highlight, the small dot may be in red, blue, or another color.

In a possible implementation, the user 309 may perform a remark operation on a name of the smart speaker 302 of the user 308. If the user 309 performs the remark operation on the name of the smart speaker 302, a name obtained after the remark is displayed in a contact details interface. If the user 309 performs the remark operation on the name of the smart speaker 302, a default name is displayed in contact details of the user 309.

For example, the default name of the smart speaker 302 may be "device type"+"of"+"contact name" or "device type"+"of"+"contact name's home". If there are a plurality of smart speakers, digits, for example, Arabic numerals 1 and 2, are added to the end of the name. Descriptions are provided by using the mobile phone of Angel as an example with reference to FIG. 6B and FIG. 10. As shown in FIG. 6B, in the details interface about the mother in the contact application of the mobile phone, Angel does not perform a remark operation on the smart speaker and the smart television of the mother, and therefore the smart speaker and the smart television of the mother are displayed in a form of a default name. A name of the speaker of the mother is "Speaker at mother's home" (shown in FIG. 6B) or "Speaker of the mother" (not shown in the figure). If the mother has two smart televisions, "Television 1 at mother's home" and "Television 2 at mother's home" (that are shown in FIG. 6B) are displayed. In the details interface, Angel may change a sequence of the foregoing televisions, and may arrange the televisions in sequence, may arrange the televisions based on a use frequency, that is, arrange a device with a higher video sequence on the top, or may arrange the televisions based on a use habit of the user. In an interface of a call record list of the mobile phone of Angel, 10021 represents a name of the device, and 10022 represents a type of the device.

Figure 10:
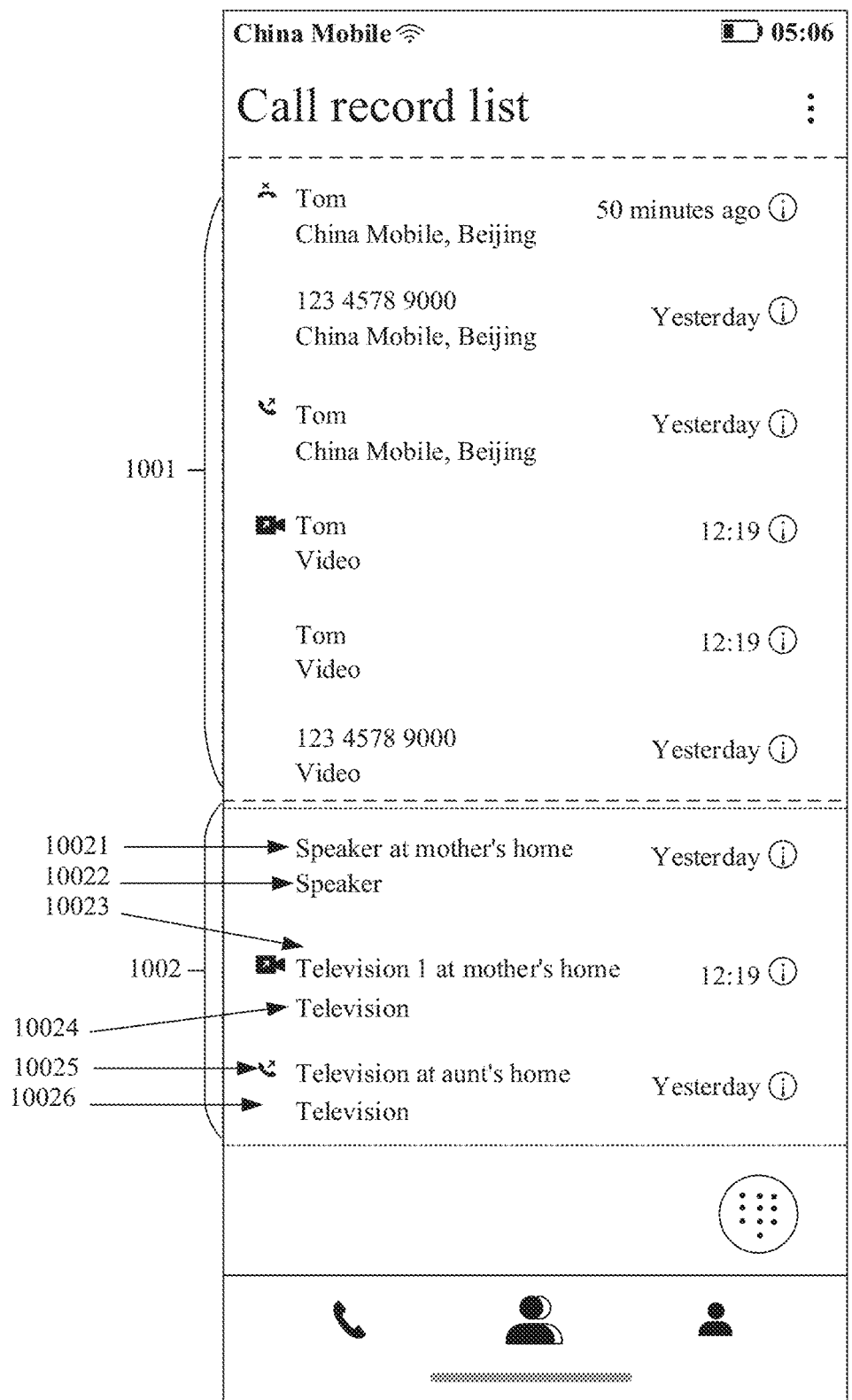
FIG. 10 is a schematic diagram of a scenario of a method for adding a smart home device according to an embodiment of this application.

For example, in the interface of the call record list, as shown in FIG. 10, a display sequence of call records may be displayed based on a classification into a call record of an operator and a communication record of a smart home device. Alternatively, a display sequence of call records may be displayed in a call time sequence, a call frequency, or the like (not shown in the figure). As shown in FIG. 10, 1001 represents the call record of the operator, and 1002 represents the communication record of the smart home device. Optionally, the part 1001 is displayed above the part 1002, or the part 1001 is displayed below the part 1002. In the part 1002, in call records, "Speaker at mother's home" represented by 10021, "Television 1 at mother's home" represented by 10023, and "Television at aunt's home" represented by 10025 are all names of devices, and 10022, 10024, and 10026 all represent types of the devices. As shown in FIG. 10, for example, a type of the smart speaker is "Speaker" (for example, 10022) and a type of the smart television is "Television" (for example, 10024 and 10026). In addition, "Speaker at mother's home" represented by 10021 may also be displayed as "Speaker of the mother".

Figure 11:
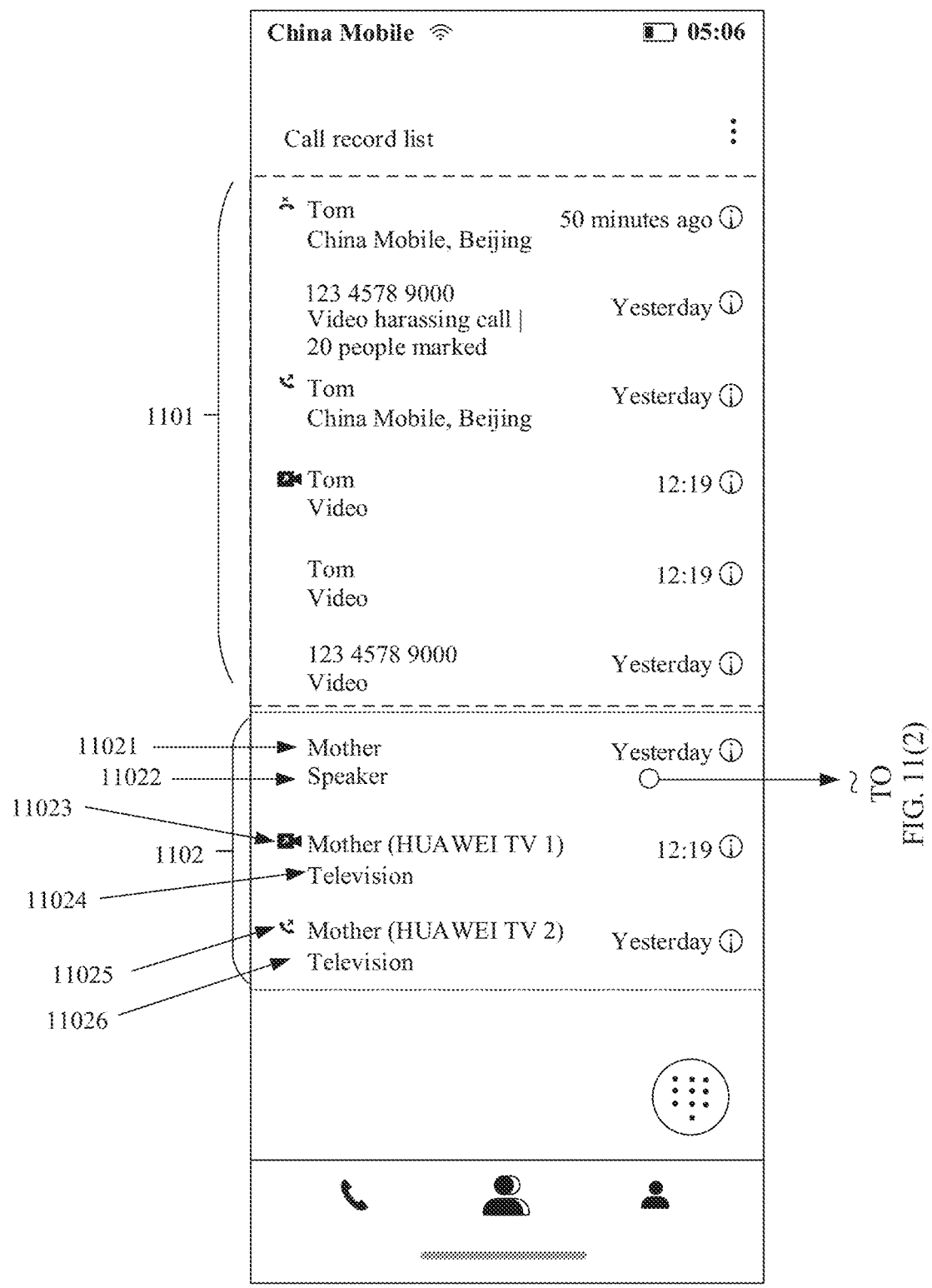
FIGS. 11(1) and FIG. 11(2) are a schematic diagram of a scenario of a method for adding a smart home device according to an embodiment of this application.
Figure 11:

For another example, a default name of the smart speaker 302 may be "device name"+"digit", where the digits may be Arabic numerals 1 and 2. Descriptions are provided by using the mobile phone of Angel as an example with reference to FIG. 11. As shown in FIGS. 11(1) and FIG. 11(2), in the details interface about the mother in the contact application of the mobile phone, Angel does not perform a remark operation on the smart speaker and the smart television of the mother, and therefore the smart speaker and the smart television of the mother are displayed in a form of a default name. A name of the speaker of the mother is "Speaker in the living room" (shown in FIG. 11(2)). If the mother has two smart televisions, "HUAWEI TV 1" and "HUAWEI TV 2" (that are shown in FIG. 11(2)) are displayed. In the details interface, Angel may change a sequence of the foregoing televisions, and may arrange the televisions in sequence, may arrange the televisions based on a use frequency, that is, arrange a device with a higher video sequence on the top, or may arrange the televisions based on a use habit of the user. In an interface of a call record list of the mobile phone of Angel, 11021, 11023, and 11025 represent names of users. If there are a plurality of devices of a same type, call records are displayed as "the names of the users (names of the devices)". In addition, 11022, 11024, and 11026 represent types of the devices.

For example, in the interface of the call record list, as shown in FIG. 11(1), a display sequence of call records may be displayed based on a classification into a call record of an operator and a communication record of a smart home device. Alternatively, a display sequence of call records may be displayed in a call time sequence, a call frequency, or the like (not shown in the figure). As shown in FIG. 11(1), 1101 represents the call record of the operator, and 1102 represents the communication record of the smart home device. Optionally, the part 1101 is displayed above the part 1102, or the part 1101 is displayed below the part 1102. In the part 1102, in call records, "Mother" represented by 11021, "Mother (HUAWEI TV 1)" represented by 11023, and "Mother (HUAWEI TV 2)" represented by 11025 are all names of contacts, and 11022, 11024, and 11026 all represent types of devices. As shown in FIG. 11(1), for example, a type of the smart speaker is "Speaker" (for example, 10022) and a type of the smart television is "Television" (for example, 11024 and 11026). In addition, "Speaker at mother's home" in the first line may also be displayed as "Speaker of the mother".

The method for adding a smart home device to contacts further includes the following step.

S505: The third electronic device receives a touch operation performed on newly added contact information, and establishes a call with the second electronic device in response to the touch operation.

For example, if the user 308 needs to make a call to the mobile phone 303 (for example, Angel) by using a VoIP service, the user 308 may initiate an input operation of a VoIP voice call on the smart speaker 302. The input operation may be specifically an operation that the user 308 enters the mobile phone number of Angel on a display of the smart speaker 302.

In some other embodiments, the input operation may alternatively be a voice input operation performed by the user 308 on the smart speaker 302. For example, the user 308 may speak "Call Angel" to the smart speaker 302. After collecting the voice signal, the smart speaker 302 may perform speech recognition on the voice signal by using a voice assistant system in the smart speaker 302, to obtain a control instruction corresponding to the voice signal. For example, the voice assistant system recognizes, based on the voice signal, that the control instruction is "Call the contact Angel". Further, the smart speaker 302 may send, to the VoIP server 305 based on the mobile phone number of Susan in the contacts, a call request for dialing the mobile phone number, so that the VoIP server 305 makes a call to the mobile phone 303 of the contact Angel. Subsequently, if the called mobile phone 303 successfully answers the call initiated by the smart speaker 302, the mobile phone 303 may send, to the VoIP server 305, a message indicating that the call is successfully answered, to establish a VoIP call between the smart speaker 302 and the called party (that is, the mobile phone 303 of the contact Angel). In this way, the user can use the smart speaker 302 to make a VoIP call to the contact.

It may be understood that in the embodiments of this application, the touch input or the voice input may be an input of the user 308, or may be an input of another user, for example, a friend or another family member such as a father, a wife, or a husband of the user 308. The smart speaker 302 may collect a voice input (that is, a voice signal) of the user from different directions by using one or more microphone arrays 170C. The smart speaker 302 may play, by using one or more speaker arrays 170A, a voice feedback performed by a voice assistant system on a speech recognition result.

In some embodiments, after collecting the voice signal of the user, the smart speaker 302 may also send the voice signal to the voice assistant server 306, and the voice assistant server 306 performs speech recognition on the voice signal, to obtain a control instruction corresponding to the voice signal. When the recognized control instruction is related to a VoIP service, the voice assistant server 305 may send the recognized control instruction to the VoIP server 305, and the VoIP server 305 establishes the VoIP service between the smart speaker 302 and the called party according to the foregoing method. Certainly, in addition to entering the voice signal, the user may perform a preset gesture or the like to initiate the call operation of the VoIP service. This is not limited in this embodiment of this application.

For example, the input operation may be a voice input of the user. For example, when the voice assistant system of the smart speaker 302 may be in an inactive state, the user may first enter a wakeup keyword, for example, "Hello, Xiao E", into the smart speaker 302 through a voice. When the smart speaker 102 detects the wakeup keyword, the voice assistant system of the smart speaker 302 is started, and a further voice input of the user is collected, so that the voice assistant system performs speech recognition processing on the voice input.

For example, the VoIP server 305 may first add the mobile phone 301 to a VoIP call between the smart speaker 302 and the mobile phone 303. Specifically, the VoIP server 305 may add the mobile phone 301 to the VoIP service between the smart speaker 302 and the mobile phone 303 based on a VoIP identifier of the mobile phone 301 in the VoIP service. In this case, a VoIP service group call is established between the mobile phone 301, the smart speaker 302, and the mobile phone 303. After the VoIP service group call is established between the mobile phone 301, the smart speaker 302, and the mobile phone 303, the mobile phone 301 may send, to the VoIP server 305, a response message indicating that the VoIP service is successfully joined.

Figure 12:
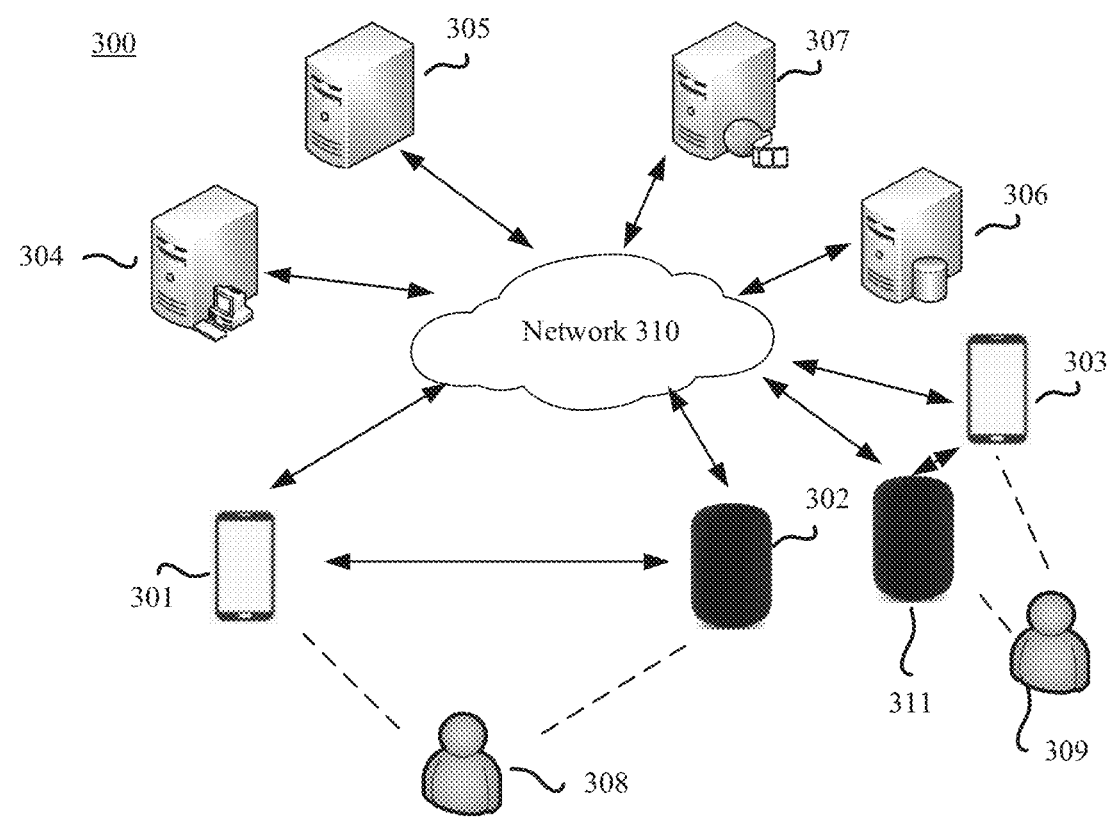
FIG. 12 is a schematic diagram of an implementation scenario of adding a smart home device according to an embodiment of this application.

In a possible implementation, as shown in FIG. 12, a fourth electronic device (for example, another smart speaker 311 in FIG. 12) and the third electronic device may be two different electronic devices that are of a same user 309. The fourth electronic device may be the same as or different from the second electronic device. In addition to the smart speaker, the fourth electronic device may be an electronic device supporting an audio/video service, for example, a smart television, a tablet computer, a notebook computer, or a desktop computer. The fourth electronic device may be used in scenarios of all the foregoing embodiments. A specific form of the fourth electronic device is not particularly limited. In the foregoing embodiments, the third electronic device may be a mobile phone, and the fourth electronic device may be a smart speaker or a notebook computer having a voice assistant system. For example, when the fourth electronic device is the another smart speaker 311, a manner of disposing the fourth electronic device is the same as that of disposing the smart speaker 302 in the foregoing embodiment. Functions such as direct dialing and calling may be implemented between the speaker 302 and the speaker 311. For a specific technical solution, refer to the related descriptions in the foregoing embodiments. Details are not described herein again.

Figure 13:
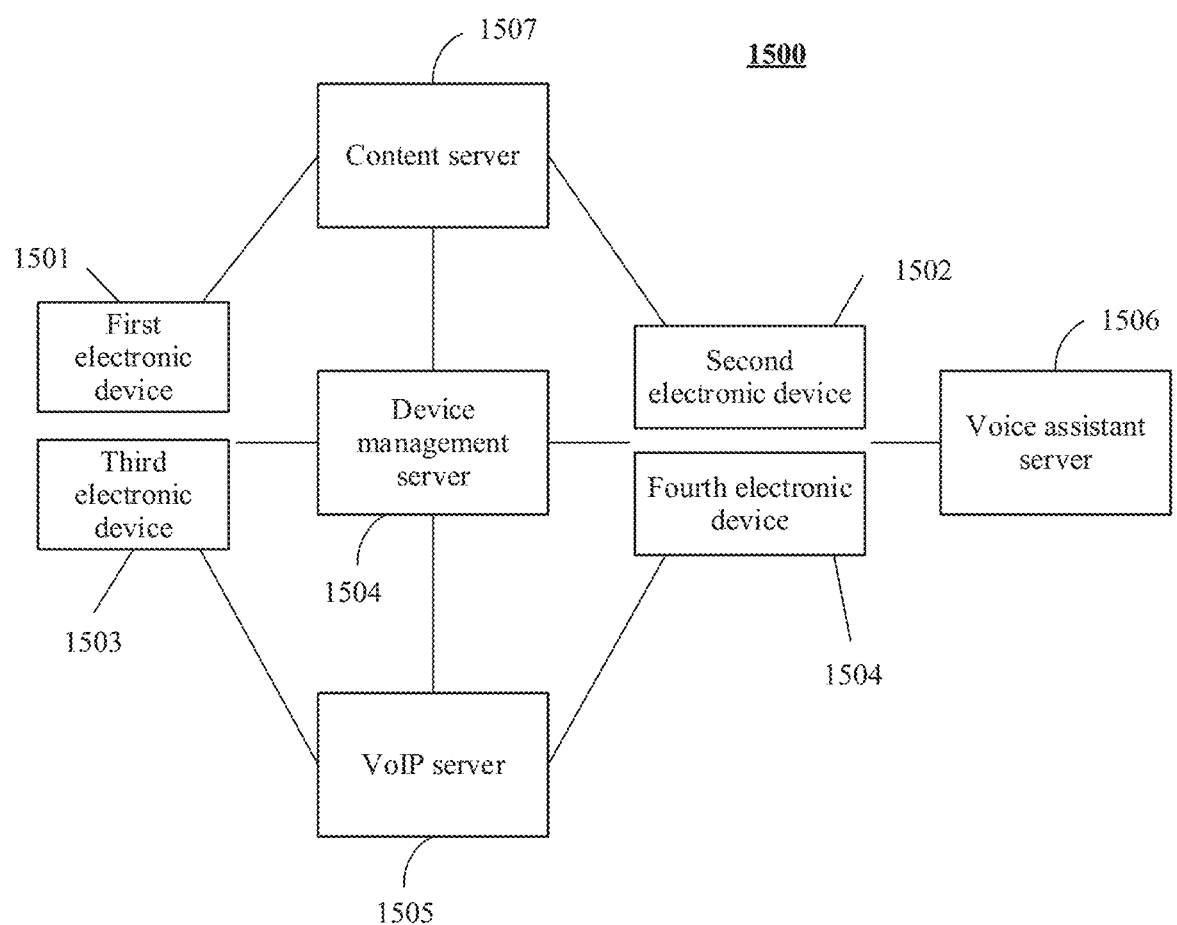
FIG. 13 is a schematic structural diagram of a system for adding a smart home device according to an embodiment of this application.

As shown in FIG. 13, an embodiment of this application provides a system 1500 for adding a smart home device. The system 1500 may include a first electronic device 1501 (for example, the mobile phone 301 in FIG. 3), a second electronic device 1502 (for example, the smart speaker 302 in FIG. 3), a third electronic device 1503 (for example, the mobile phone 303 in FIG. 3), a device management server 1504 (for example, the device management server 304 in FIG. 3), and a VoIP server 1505 (for example, the VoIP server 305 in FIG. 3). The system 1500 may be configured to implement the technical solution of adding the smart home device in the foregoing embodiments. Details are not described herein again.

In some other embodiments, the system 1500 may further include a fourth electronic device (for example, the smart speaker 311 in FIG. 12), and a function of the fourth electronic device is the same as the function of the second electronic device (for example, the smart speaker 302 in FIG. 3) in the foregoing embodiment.

In some other embodiments, the system 1500 may further include a voice assistant server 1506 (for example, the voice assistant server 306 in FIG. 3) and a content server 1507 (for example, the content server 307 in FIG. 3). A function of the voice assistant server 1506 is the same as the function of the voice assistant server 306 in the foregoing embodiment, and a function of the content server 1507 is the same as the function of the content server 307 in the foregoing embodiment.

Based on the foregoing descriptions of the implementations, a person skilled in the art may clearly understand that for the purpose of convenient and brief descriptions, division into the foregoing functional modules is merely used as an example for illustration. In actual application, the foregoing functions can be allocated to different functional modules for implementation based on a requirement, that is, an inner structure of an apparatus is divided into different functional modules to implement all or some of the functions described above. For detailed working processes of the system, the apparatus, and the unit described above, refer to corresponding processes in the foregoing method embodiments. Details are not described herein again.

Functional units in the embodiments of this application may be integrated into one processing unit, each of the units may exist alone physically, or two or more units are integrated into one unit. The integrated unit may be implemented in a form of hardware, or may be implemented in a form of a software functional unit.

The foregoing descriptions are merely implementations of the embodiments of this application, but are not intended to limit the protection scope of the embodiments of this application. Any variation or replacement within the technical scope disclosed in the embodiments of this application shall fall within the protection scope of the embodiments of this application. Therefore, the protection scope of the embodiments of this application shall be subject to the protection scope of the claims.

What is claimed is:
1. A system comprising:
a server;
a smart home device comprising third contact information and configured to log in to a first account of a first user;

a second electronic device configured to:
  store first contact information of the first user; and
  log in to a second account of a second user; and
a first electronic device configured to:
  log in to the second account;
  store second contact information of the second user;
  send a device identifier of the smart home device to the server; and
  set that the second electronic device is allowed to make a call to the smart home device,
wherein the server is configured to:
  receive the device identifier from the first electronic device; and
  send the device identifier to the second electronic device based on a fact that the first electronic device sets that the second electronic device is allowed to make the call to the smart home device, and
wherein the second electronic device is further configured to:
  receive the device identifier from the server;
  automatically add, based on the device identifier, the third contact information to the second electronic device;
  detect a first touch input or a first voice input; and
  establish, in response to the first touch input or the first voice input, a voice call or a video call with the smart home device.

2. The system of claim 1, wherein the server is further configured to store first account information of the first user and second account information of the second user.

3. The system of claim 2, wherein before sending the device identifier to the second electronic device, the server is further configured to determine that the first electronic device has stored the second contact information and the second electronic device has stored the first contact information.

4. The system of claim 1, wherein the first electronic device is further configured to send a first switching request requesting to switch the voice call or the video call to the first electronic device.

5. The system of claim 1, wherein the second electronic device is further configured to automatically add the third contact information to contacts of the second electronic device.

6. The system of claim 5, wherein the contacts further comprise the first contact information.

7. The system of claim 1, wherein the second electronic device is further configured to display a notification message prompting the second user that the voice call or the video call is allowed to be made to the smart home device using the third contact information.

8. The system of claim 7, wherein the second electronic device is further configured to further display the notification message in a form of a banner.

9. The system of claim 7, wherein the second electronic device is further configured to further display the notification message in an interface after a notification panel is pulled down.

10. The system of claim 5, wherein the second electronic device is further configured to:
  display the third contact information in the contacts, wherein the third contact information comprises a first name of the smart home device; and
  display, in response to a remark operation that has been performed on the first name, the first name in the contacts using a second name obtained after the remark operation.

11. A second electronic device comprising:
a memory configured to store instructions; and
a processor coupled to the memory, wherein when executed by the processor, the instructions cause the second electronic device to:
  store first contact information of a first user, wherein the first contact information comprises a third contact information of a first electronic device that is logged in to a first account of the first user;
  log in to a second account of a second user;
  receive, from the first electronic device via a server, a device identifier of a smart home device that is logged in to the first account, wherein the smart home device comprises second contact information;
  automatically add the second contact information to the first contact information based on the device identifier;
  detect a first touch operation or a first voice input; and
  establish, in response to the first touch operation or the first voice input and using the second contact information, a voice call or a video call with the smart home device.

12. The second electronic device of claim 11, wherein when executed by the processor, the instructions further cause the second electronic device to display a notification message prompting the second user that the voice call or the video call can be made to the smart home device using the second contact information.

13. The second electronic device of claim 12, wherein when executed by the processor, the instructions further cause the second electronic device to further display the notification message in a form of a banner.

14. The second electronic device of claim 12, wherein when executed by the processor, the instructions further cause the second electronic device to further display the notification message in an interface that has been obtained after a notification panel is pulled down.

15. The second electronic device of claim 11, wherein when executed by the processor, the instructions further cause the second electronic device to automatically add the second contact information to contacts of the second electronic device.

16. The second electronic device of claim 11, wherein when executed by the processor, the instructions further cause the second electronic device to store the first contact information in contacts of the second electronic device.

17. The second electronic device of claim 11, wherein when executed by the processor, the instructions further cause the second electronic device to:
  display the second contact information in contacts of the second electronic device, wherein the second contact information comprises a first name of the smart home device; and
  display, in response to a remark operation on the first name, the first name using a second name that has been obtained after the remark operation.

18. A first electronic device comprising:
a memory configured to store instructions; and
a processor coupled to the memory, wherein when executed by the processor, the instructions cause the first electronic device to:
  log in to a first account of a first user;
  send, to a server, a device identifier of a smart home device that is logged in to the first account;
  receive an operation on contact information of a second user requesting to allow a second electronic device to make a call to the smart home device; and cause the server to send the device identifier to the second electronic device based on the operation to enable the second electronic device to:

receive the device identifier from the server;

automatically add, based on the device identifier, second contact information of the smart home device;

detect a first touch input or a first voice input; and establish, in response to the first touch input or the first voice input, a voice call or a video call with the smart home device.

19. The first electronic device of claim 18, wherein when executed by the processor, the instructions further cause the first electronic device to display a notification message prompting the second user that a voice call is allowed to be made to the smart home device using the contact information.

20. The first electronic device of claim 18, wherein when executed by the processor, the instructions further cause the first electronic device to display a notification message prompting the second user that a video call is allowed to be made to the smart home device using the contact information.

* * * * *